United States Patent [19]
Chari

[11] Patent Number: 6,046,742
[45] Date of Patent: *Apr. 4, 2000

[54] DISPLAY OF SYSTEM INFORMATION

[75] Inventor: Srikumar N. Chari, Cupertino, Calif.

[73] Assignee: Micron Electronics, Inc., Boise, Id.

[*] Notice: This patent is subject to a terminal disclaimer.

[21] Appl. No.: 08/942,195

[22] Filed: Oct. 1, 1997

Related U.S. Application Data

[60] Provisional application No. 60/046,310, May 13, 1997.

[51] Int. Cl.$^7$ .............................. G06F 3/00; G06F 15/177

[52] U.S. Cl. .......................... 345/349; 345/346; 345/356; 345/357; 345/969; 709/223

[58] Field of Search ..................................... 345/346, 349, 345/353, 356, 357, 967–970, 975; 395/200.53, 200.54; 364/188; 709/223, 224

[56] References Cited

U.S. PATENT DOCUMENTS

| | | | |
|---|---|---|---|
| 4,999,787 | 3/1991 | McNally et al. | 364/514 |
| 5,210,855 | 5/1993 | Bartol | 395/500 |
| 5,261,044 | 11/1993 | Dev et al. | 345/357 |
| 5,340,340 | 8/1994 | Hastings et al. | 439/64 |
| 5,386,567 | 1/1995 | Lien et al. | 395/700 |
| 5,487,148 | 1/1996 | Komori et al. | 395/182.02 |
| 5,491,796 | 2/1996 | Wanderer et al. | 395/200.09 |
| 5,546,595 | 8/1996 | Norman et al. | 395/800 |
| 5,576,946 | 11/1996 | Bender et al. | 364/146 |
| 5,579,491 | 11/1996 | Jeffries et al. | 395/283 |
| 5,621,892 | 4/1997 | Cook | 395/200.54 |
| 5,638,289 | 6/1997 | Yamada et al. | 364/489 |
| 5,651,006 | 7/1997 | Fujino et al. | 370/408 |
| 5,652,892 | 7/1997 | Ugajin | 395/750 |
| 5,655,081 | 8/1997 | Bonnell et al. | 395/200.32 |
| 5,671,441 | 9/1997 | Glassen et al. | 710/8 |
| 5,678,042 | 10/1997 | Pisello et al. | 395/610 |
| 5,684,945 | 11/1997 | Chen et al. | 395/182.18 |
| 5,689,637 | 11/1997 | Johnson et al. | 395/182.22 |
| 5,745,897 | 4/1998 | Perkins et al. | 707/101 |

(List continued on next page.)

OTHER PUBLICATIONS

IBM Technical Disclosure Bulletin, 35(2): 69–74, Jul. 1992, "Serial Channel Synchronizer".

IBM Technical Disclosure Bulletin, 39(7): 229–230, Jul. 1996.

Jacquelyn Gavron & Joseph Moran, "How to Use Microsoft Windows NT 4 Worstation", Ziff Davis Press, pp. 27, 35, 38–39, 41, 49, 155. 1996.

Robert Cowart, "Mastering Windows 3.1", Sybex, pp. 119, 814, 1992.

"Plug and Play BIOS Specification", Compaq Computer Corporation Phoenix Technologies, Ltd., Intel Corporation, Version 1.0A, May 5, 1994, pp. 1–55.

"NetFRAME's New High–Availability Cluster Server Systems Avoid Scheduled as well as Unscheduled Downtime", NetFRAME News Release, NetFRAME Systems Incorporated, pp. 1–3.

"NetFRAME ClusterServers", NetFRAME Systems Incorporated, Mar. 1996, pp. 1–10.

Primary Examiner—Raymond J. Bayerl
Assistant Examiner—X. L. Bautista
Attorney, Agent, or Firm—Knobbe, Martens, Olson & Bear, LLP

[57] ABSTRACT

A method for organizing and displaying management information regarding the hardware and software components in a computer network. The invention organizes the data into major component groups and displays these groups and their devices in clear, descriptive language. The method comprises a plurality of operational parameters about different components in a computer network. The operational parameters are organized into a plurality of hierarchical levels. The method further comprises a plurality of forms which enable the modification of one or more of the operational parameters. Each of the forms correspond to one of the hierarchical levels.

22 Claims, 42 Drawing Sheets

Microfiche Appendix Included
(1 Microfiche, 31 Pages)

U.S. PATENT DOCUMENTS

| | | | |
|---|---|---|---|
| 5,751,575 | 5/1998 | Hirosawa et al. | 364/188 |
| 5,754,426 | 5/1998 | Dumais | 364/188 |
| 5,758,103 | 5/1998 | Oh | 395/283 |
| 5,761,085 | 6/1998 | Giorgio | 702/333 |
| 5,761,429 | 6/1998 | Thompson | 395/200.54 |
| 5,764,911 | 6/1998 | Tezuka et al. | 395/200.53 |
| 5,764,913 | 6/1998 | Jancke et al. | 395/200.54 |
| 5,768,541 | 6/1998 | Pan-Ratzlaff | 395/283 |
| 5,774,667 | 6/1998 | Garvey et al. | 395/200.52 |
| 5,784,576 | 7/1998 | Guthrie et al. | 395/283 |
| 5,787,246 | 7/1998 | Lichtman et al. | 395/200.5 |
| 5,812,750 | 9/1998 | Dev et al. | 395/182.02 |
| 5,826,046 | 10/1998 | Nguyen et al. | 395/309 |
| 5,838,319 | 11/1998 | Guzak et al. | 345/340 |
| 5,901,304 | 5/1999 | Hwang et al. | 395/500 |
| 5,913,037 | 6/1999 | Spofford et al. | 395/200.56 |
| 5,922,051 | 7/1999 | Sidey | 709/223 |

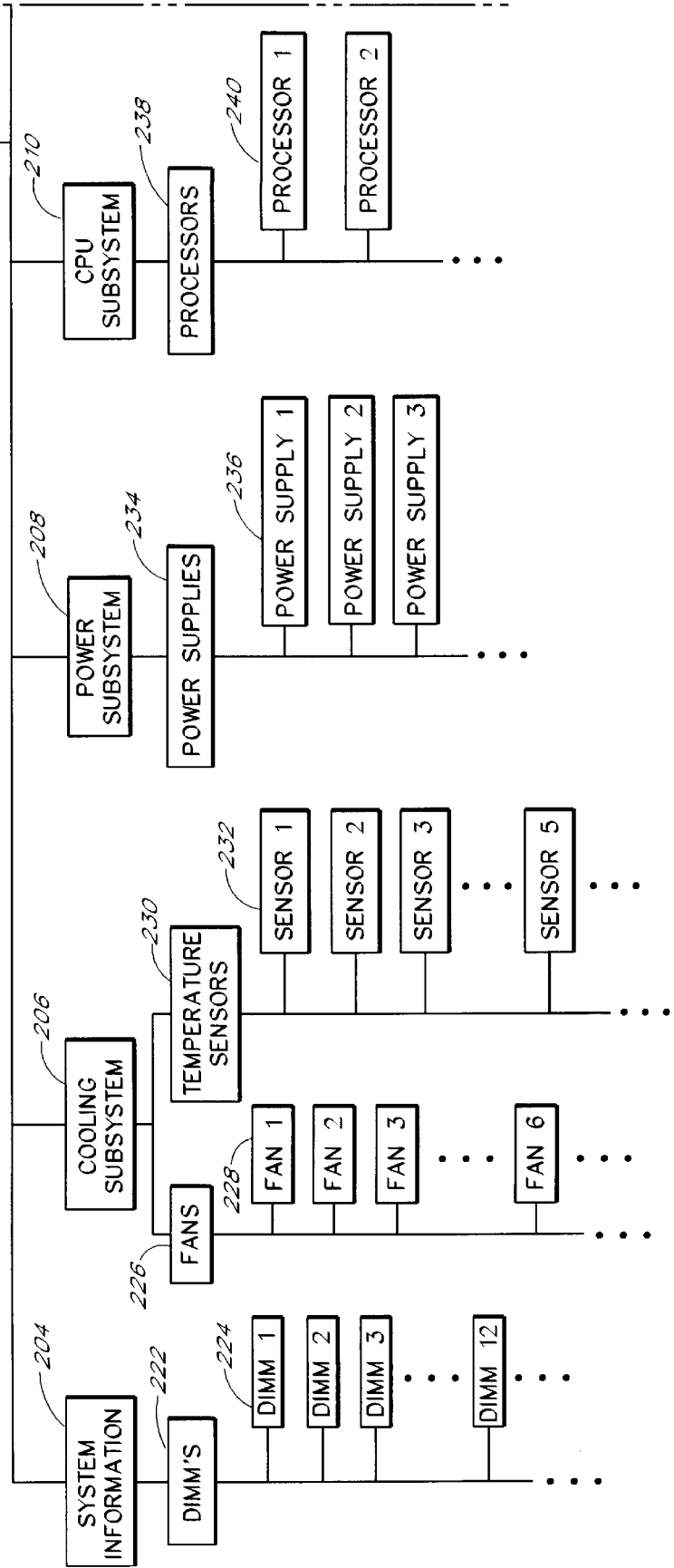

4 powerGroup
   1 powerSystemBoard5VoltLine
   2 powerSystemBoard3_3Voltline
   3 powerSystemBoard12VoltLine
   4 powerSystemBoardNeg12Voltline
   5 powerSwitch
   6 powerSystemResetSwitch
   7 powerSupplyMaximumNumberOfPowerSupplies
   8 powerSupplyTable
      1 powerSupplyTableEntry
         1 powerSupplyNumber
         2 powerSupplySerialNumber
         3 powerSupplyDcState
         4 powerSupplyAcState
         5 powerSupplyLocation
5 cpuGroup
   1 cpuBusToCoreRatio
   2 cpuClockFrequency
   3 cpuMaximumNumberOfCpus
   4 cpuTable
      1 cpuTableEntry
         1 cpuNumber
         2 cpuState
6 adapterGroup
   1 adapterTable
      1 adapterTableEntry
         1 adapterNumber
         2 adapterName
         3 adapterSupportHotSwapHotAdd
         4 adapterState
         5 adapterCommand
         6 adapterDriveNumber
         7 adapterBusNumber
         8 adapterDeviceNumber
         9 adapterFunctionNumber
        10 adapterVendorId
        11 adapterDeviceId
        12 adapterRevisionId
        13 adapterBaseClass
        14 adapterSubClass
        15 adapterProgrammingInterface

```
7 driverGroup
    1 driverTable
        1 driverTableEntry
            1 driverNumber
            2 driverName
            3 driverVersion
8 slotGroup
    1 slotTable
        1 slotTableEntry
            1 slotGroupNumber
            2 slotNumber
            3 slotBusNumber
            4 slotDeviceNumber
            5 slotAdapterPresence
            6 slotPowerState
            7 slotLocation
9 canisterGroup
    1 canisterMaximumNumberOfCanisters
    2 canisterTable
        1 canisterTableEntry
            1 canisterNumber
            2 canisterName
            3 canisterSerialNumber
            4 canisterRevisionInfo
            5 canisterDescription
            6 canisterPowerState
            7 canisterLocation
            8 canisterFanMinSpeed
            9 canisterFanSpeedSetting
            10 canisterFan1Speed
            11 canisterFan1Fault
            12 canisterFan2Speed
            13 canisterFan2Fault
10 slotFanGroup
    1 slotFanMaximumNumberOfFans
    2 slotFanTable
        1 slotFanTableEntry
            1 slotFanNumber
            2 slotFanMinSpeed
            3 slotFanSpeedSetting
            4 slotFanSpeed
            5 slotFanFault
            6 slotFanLocation
```

FIG. 3B

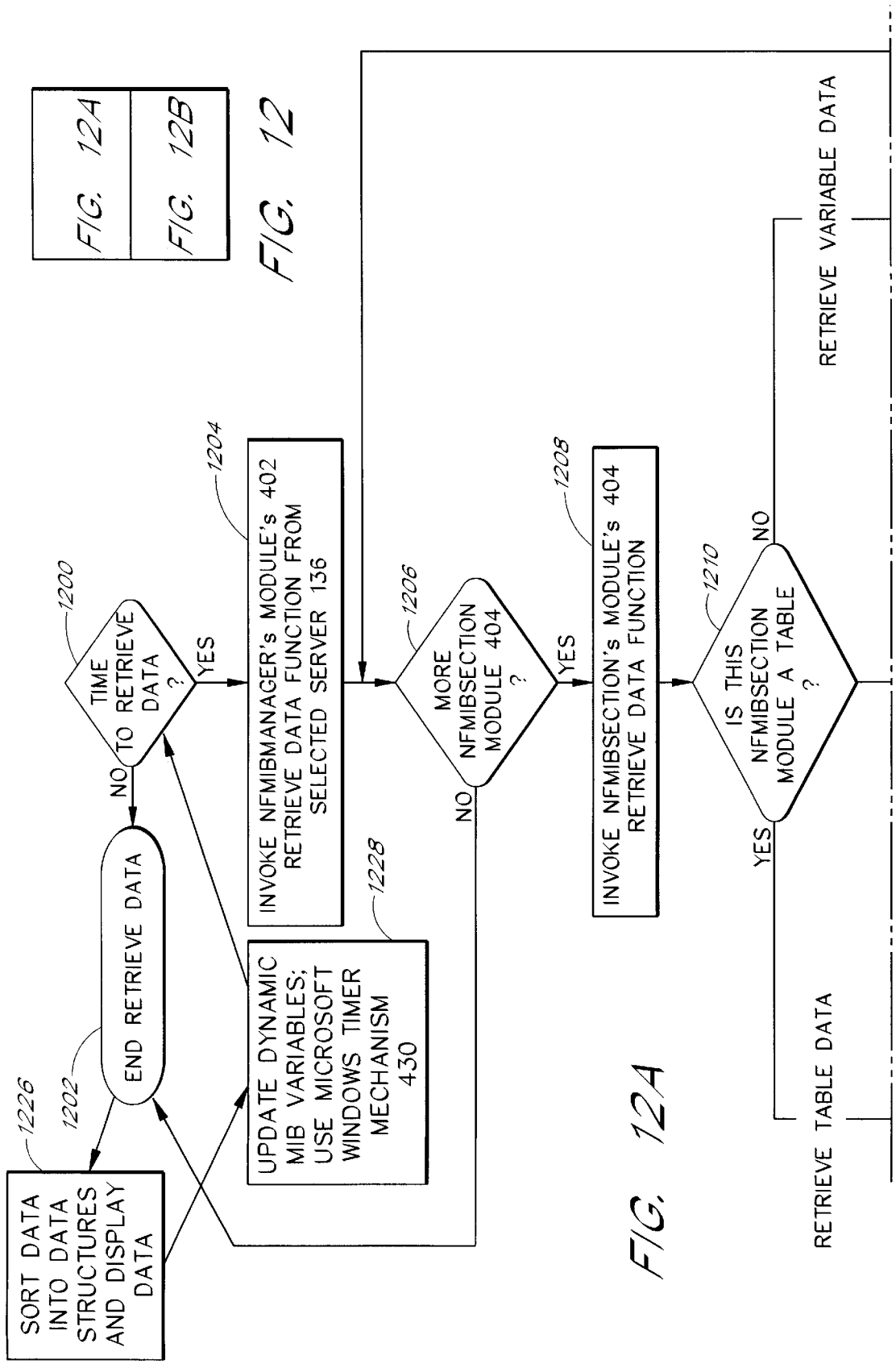

6,046,742

DISPLAY OF SYSTEM INFORMATION

RELATED APPLICATIONS

The subject matter of U.S. patent application entitled "System Management Graphical User Interface," filed on Oct. 1, 1997, application Ser. No. 08/943,357, and having attorney Docket No. MNFRAME.028A is related to this application.

PRIORITY CLAIM

The benefit under 35 U.S.C. § 119(e) of the following U.S. provisional application(s) is hereby claimed:

| Title | application Ser. No. | Filing Date |
|---|---|---|
| "High Performance Network Server System Management Interface" | 60/046,310 | May 13, 1997 |

APPENDICES

Appendix A, which forms a part of this disclosure, is a list of commonly owned copending U.S. patent applications. Each one of the applications listed in Appendix A is hereby incorporated herein in its entirety by reference thereto.

The microfiche appendix, consisting of one sheet of 31 frames, which forms a part of the disclosure of this patent application, is a copy of the definition of the NF9000 MIB Definitions and is entitled "Appendix 6: NF9000 MIB Definitions."

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the organization and display of data about components in a computer network. Specifically, the present invention is an apparatus and method for obtaining, organizing or displaying data related to network components.

BACKGROUND OF THE INVENTION

Simple Network Management Protocol

Computer network management systems use a standardized communication protocol to facilitate communication between devices (computers, printers, peripherals) on the network. The standardized communication protocol discussed with this invention is known as the Simple Network Management Protocol (SNMP). SNMP is explained in more detail in *The Simple Book* by Marshall T. Rose, 2d ed, Prentice-Hall, Inc., 1994, which is hereby incorporated herein by reference. The SNMP acts as a mechanism to provide and transport management information between network components. SNMP is recognized as an industry standard for network management.

Whenever a program at the user site sends a request to a program at the server site and waits for a response, the requesting program is called the "client" and the responding program is called the "server." In network Server management systems, the user (usually a network administrator) uses a software module known as an SNMP manager to monitor and manage the server or servers in a network. The SNMP manager sends commands and receives information through the network from a software module called a SNMP agent, which directly monitors the server through device drivers and other components. For example, an SNMP manager may request, from the SNMP agent, information regarding the amount of unused memory on a memory module. The SNMP manager and the SNMP agent can be on the same workstation, or the SNMP manager can be at a remote location.

SNMP uses a transport protocol stack such as User Datagram Protocol/internet Protocol (UDP/IP) or Transmission Control Protocol/Internet Protocol (TCP/IP). UDP/IP provides connectionless communication over user Internet Protocol services. It is part of the TCP/IP suite. UDP/IP operates at the transport layer, and in contrast to TCP/IP, does not guarantee the delivery of data. TCP/IP is standard Internet protocol (or set of protocols) which specifies how two computers exchange data over the Internet. TCP/IP handles issues such as packetization, packet addressing, handshaking and error correction. For more information on TCP/IP, see Volumes I, II and III of Comer and Stevens, Internetworking with TCP/IP, Prentice Hall, Inc., ISBNs 0-13-468505-9 (vol. I), 0-13-125527-4 (vol. II), and 0-13-474222-2 (vol. III).

Upon receiving a data request by a user, the SNMP manager opens one or more SNMP sessions and formulates a proper information request for SNMP agent. The SNMP manager is the client and the SNMP agent is the server. The SNMP manager may be generic or specifically designed for the particular server type.

Typically, the SNMP manager has several parts, each performing a different function. But these parts are related and work together to accomplish certain tasks.

SNMP Management Information Base

When formulating the information request, the SNMP manager may use a set of variables called the Management Information Base (MIB). In general, an MIB defines the aspects of the system and/or the components in the system, such as a disk drive or a memory module. The MIB also contains numeric identifiers which tell system components how to access each variable. The MIB is a hierarchal collection of variables and the description of each variable related to the hardware and software components of the network.

Using the variable set of the MIB, the SNMP manager creates an information request which is sent to the SNMP agent.

Disadvantages of Existing Server Management Applications

Many existing network and server management applications can read and display SNMP MIB data. With the popularity of user-interface platforms, such as Windows NT and Windows 95, many of these applications use the features of Windows NT and Windows 95 platforms to display SNMP MIB data. Examples include the "HP Openview" manufactured by Hewlett Packard, the "LAN Desk Manager" manufactured by Intel, and "ObjectView" in the Unicenter TNG Total Enterprise Management Suite manufactured by Computer Associates International.

Currently, some network management applications have a main window which is split vertically into two parts (two-pane window) to display SNMP MIB data. Typically, the left pane contains the SNMP MIB of the server, while the right pane displays the values of the SNMP MIB variables in plain text or in columns.

While these network management applications display SNMP MIB data, they are cumbersome and non-intuitive. In real-world situations where performance time is critical, these applications fail to provide the user quick access to information concerning the network.

First, in current systems when the network administrator needs specific information about the network, the prior inventions are difficult to access because the MIB variables on the left pane may not be displayed or organized in an intuitive manner. The user cannot quickly browse and find a particular component group or a specific device.

Adding to the problem is the ambiguous descriptions of the MIB variables. For example, in the "ObjectView" application of the Unicenter TNG Total Enterprise Management Suite, the user may not know what the MIB variable "Rmtntrfce Controller Revision I" represents. This inefficiency is more significant when the user needs to access key variables quickly in order to react to a malfunction detected on the network.

Minimizing computer server downtime is a major concern in computer network systems. With emerging Internet, intranet and collaborative applications taking on more essential business roles every day, the cost of network server downtime will continue to spiral upward.

Furthermore, some MIB variables, such as entries in a table, are not accessible to the user because they are used internally by the network management software. In addition, MIB variables are read-only and cannot be modified by the user. Many of the prior server management applications show the entire MIB—all the variables in the MIB regardless of their status. This creates user confusion. Further, the value of the MIB variable is unknown, the value may be displayed on the right pane as "????" or "Not Available."

In other cases, the right pane only displays two or three variables at a time, instead of simultaneously showing all the critical or related variables that the user needs. Consequently, a user may need to proceed variable by variable. This is highly inefficient. Users often need immediate access to several distinct variables or a group of variables to make a decision regarding network problems. Reducing the time to access key variables is especially important when the user needs to perform emergency tasks.

Moreover, even when two or three MIB variable values are displayed together on the right pane, not all variables important to the user may not be grouped together. For example, two important variables may be separated by three or four unimportant variables such as "serial number" or "description." Since the right pane of the window only shows two or three variable values at a time, the user must use the scroll bars to jump back and forth to compare the values of the important variables.

In addition, the MIB variables are often displayed in nondescript columns on the right without an explanation of what the MIB variable represents. As in the example above, for the left part of the window, the user may not know what the MIB variable "Rmtntrfce Controller Revision I" represents. If the user is unfamiliar with the variable names, he or she must spend time to look up the variables in user support manuals. Again, this inefficiency is more pronounced in critical situations when there is a malfunction on the server.

Still further, the values for each MIB variable may not be labelled in the right pane of the window. The user may not know the units of the values. For example, in some of the "ObjectView" application of the Unicenter TNG Total Enterprise Management Suite, the value of a memory size variable is not labelled. Again, the user must look up the variable in a support manual.

In addition, in many of these prior applications, such as the "ObjectView" application of the Unicenter TNG Total Enterprise Management Suite, it is time-consuming to change the values of MIB variables. In order to change the value of a MIB variable, the user may need to click on the right button of the mouse, which opens a separate menu list box, and select the menu item to change variables. This opens another dialog box in which the user actually changes the variable. The user must close this dialog box in order to return to the server management application. The user must repeat this operation each time the user needs to change more than one variable. This can be time-consuming and degrade network performance, particularly if the network administrator needs to change a series of variables.

Furthermore, it is often unclear which MIB variables can be changed and which cannot be changed. The user must determine which variables are read-write and which are read-only by trial and error or by looking up the variable in a support manual.

Extra time spent training personnel on how to operate the server management application leads to increased costs and lost productivity. Efficiency becomes even more crucial for companies which have large networks and where timing is critical, such as airlines and banks. A network administrator may need to quickly find and modify different MIB variables for different servers. For example, an airline network may have several servers where timing, number of transactions, and size of transactions are different for each server. An airline may use one server for managing ticket sales, one server to handle frequent flyer transactions, and another server to handle arriving flight information. Each server may have its own type of network components, response times, backup systems, etc. Quick access to a server's information could save a company significant sums.

SUMMARY OF THE INVENTION

The present invention provides a method for displaying information regarding components in a computer network. The method comprises a plurality of operational parameters about different components in a computer network. The operational parameters are organized into a plurality of hierarchical levels. One embodiment of the method further comprises a plurality of forms which enable the modification of one or more of the operational parameters. Each of the forms correspond to one of the hierarchical levels. One embodiment of the method further comprises a display module existing in a computer. The display module further comprises a first display pane configured to display the hierarchical levels. The first display pane is further configured to enable the selection of one of the hierarchical levels. The display module further comprises a second display pane configured display the form corresponding to the selected hierarchical level.

BRIEF DESCRIPTION OF THE DRAWINGS

FIGS. 2A and 2B illustrate an organization data structure in one embodiment of the present invention.

FIG. 3 illustrates the hierarchal organization of network data variables in one embodiment of the invention.

FIGS. 12A and 12B illustrate the process of retrieving data from a network server in one embodiment of the present invention.

DETAILED DESCRIPTION OF THE INVENTION

Most Windows NT or Windows 95 users are familiar with dialog boxes and how to view (scroll bars) and change variables. Dialog boxes also aggregate related fields of data in a single display window. One embodiment of the present invention takes advantage of this familiarity with dialog boxes to display SNMP MIB data in an organized, easy-to-navigate format. The network administrator (the user) can browse and modify all the data fields related to a MIB group in a single window.

One embodiment of the present invention allows the user to "browse" through the MIB-defined variables of a computer network. Essentially, the MIB data is a hierarchal collection of data concerning all the hardware and software components in the computer network.

Architectural Overview

Figure 1:
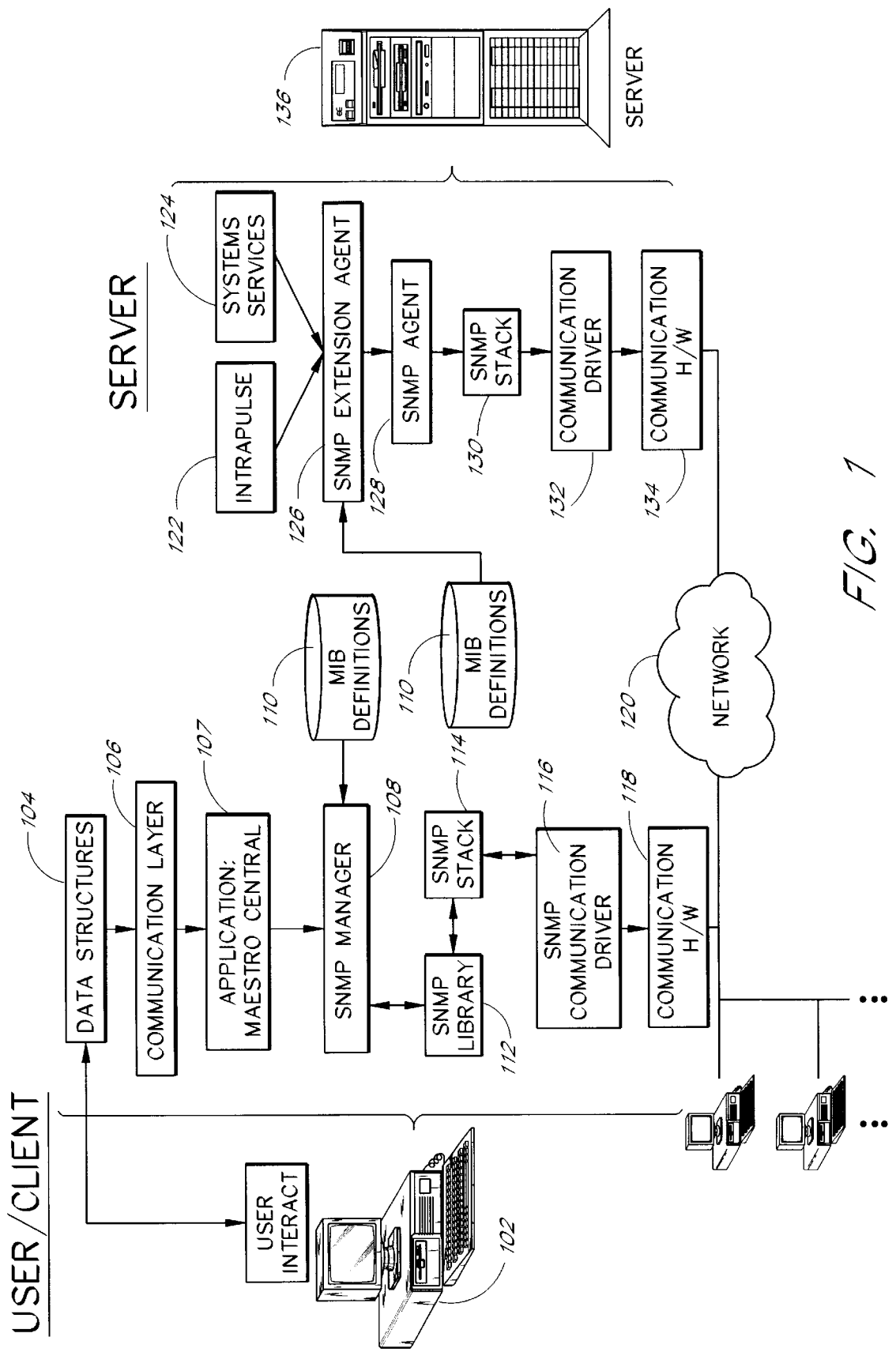
FIG. 1 illustrates a high-level architectural overview of a network management system in accordance with one embodiment of the invention.

FIG. 1 illustrates a high level architectural overview of a network management system appropriate for use with one embodiment of the invention. In one embodiment of the invention, the client and server computers 102 and 136 are on multi-processor Pentium Pro-based computers having 256 megabytes or more of RAM. It will be apparent to those of ordinary skill in the art, however, that the computers 102 and 136 may be any conventional general purpose single- or multi-chip microprocessor such as a Pentium processor, a Pentium Pro processor, a 8051 processor, a MIPS processor, a Power PC processor, an ALPHA processor, etc. In addition, the computers 102 and 136 may be any conventional special purpose microprocessor such as a digital signal processor or a graphics processor.

In one embodiment of the present invention, the server 136 is an NF9008 (also known as NF9000-T) manufactured by NetFRAME Systems Incorporated of Milpitas, Calif. The NF9008 series are fault-tolerant, standards-based servers, which have multiple peripheral component interconnect (PCI) card slots for one or more adapters. In another embodiment of the present invention, the server 136 is an NF9016 (also known as an NF9000-C), which has multiple canisters or fault isolation units (FIU). These canisters are boxes which may each contain more than one PCI adaptor card slots. Multiple card slots and multiple canisters allow the user to remove or add adapters to the server 136 while the server 136 and operating system continue to run.

At the user (or client) side, the SNMP manager 108 displays data to the user through a communication layer that organizes the data into data structures. When the SNMP manager 108 receives a command from the user, it calls a standard Windows SNMP Library of objects 112, which sends messages using an SNMP protocol stack 114, such as UDP/IP, to the SNMP agent 128 via a network of drivers 116, adapters 118, and network medium 120.

In one embodiment of the present invention, the system management graphical user interface application is contained in a software module 107 which operates with the SNMP manager 108. In one embodiment, the software module 107 is called Maestro Central 107 manufactured by NetFRAME Systems Incorporated of Milpitas, Calif. Maestro Central 107 may be used in a Microsoft Windows environment. Maestro Central 107 may send instructions to the SNMP manager 108.

At the server side, the SNMP agent 128 retrieves information detected in the server 136. If there is more than one server 136 in the network, then there is an SNMP agent 128 associated with each server 136.

In one embodiment of the present invention, the SNMP agent 128 retrieves information from device drivers 124 and a self-contained network of distributed service microprocessors called Intrapulse 122. Intrapulse 122 is manufactured by NetFRAME Systems Incorporated of Milpitas, Calif. This self-contained network continuously monitors and manages the physical environment of the server, regardless of the operational status of the server 136 (a component of the server 136 may be malfunctioning). The SNMP agent 128 also sends messages to the SNMP manager 108 via a network of drivers 132, adapters 134, and network medium 120.

Overview of Module-level Structure and Description of Modules

An 'object' as used here and in object-oriented programming is a variable that may comprise both routines (methods) and data. An object is treated as a discrete entity and may have its own address. Some objects, may only contain data and no routines.

A 'class' as used here is a blueprint of an object. From a class with specified properties, methods, and functions, the application can create objects with those same properties, methods, and functions. Once the object is created, the application can modify the properties of the object and the data in the object. An application can use multiple objects of the same class. A class may also be used to describe a group of objects sharing the same properties, etc.

Objects and classes are explained in more detail in Object Programming with Visual Basic4 by Joel P. Dehlin and Matthew J. Curland, Microsoft Press, 1996, and Computer Dictionary by collective authors, Microsoft Press, 1991, which are hereby incorporated herein in its entirety by reference.

In the following description of one embodiment of the invention, a 'module' includes, but is not limited to, software or hardware components which perform certain tasks. Thus, a module may include object-oriented software components, class components, procedures, methods, functions, subroutines, data structures, segments of program code, drivers, firmware, microcode, circuitry, data, data structures, tables, arrays, etc. In addition, those with ordinary skill in the art will recognize that a module can be implemented using a wide variety of different software and hardware techniques. A module may also mean a published report by a group of experts defining MIB objects for a particular area of technology. RFC 1213, *Management Information Base for Network Management of TCP/IP-based Internets: MIB-II* contains a module defining the basic objects needed to manage a TCP-IP network.

Figure 4:
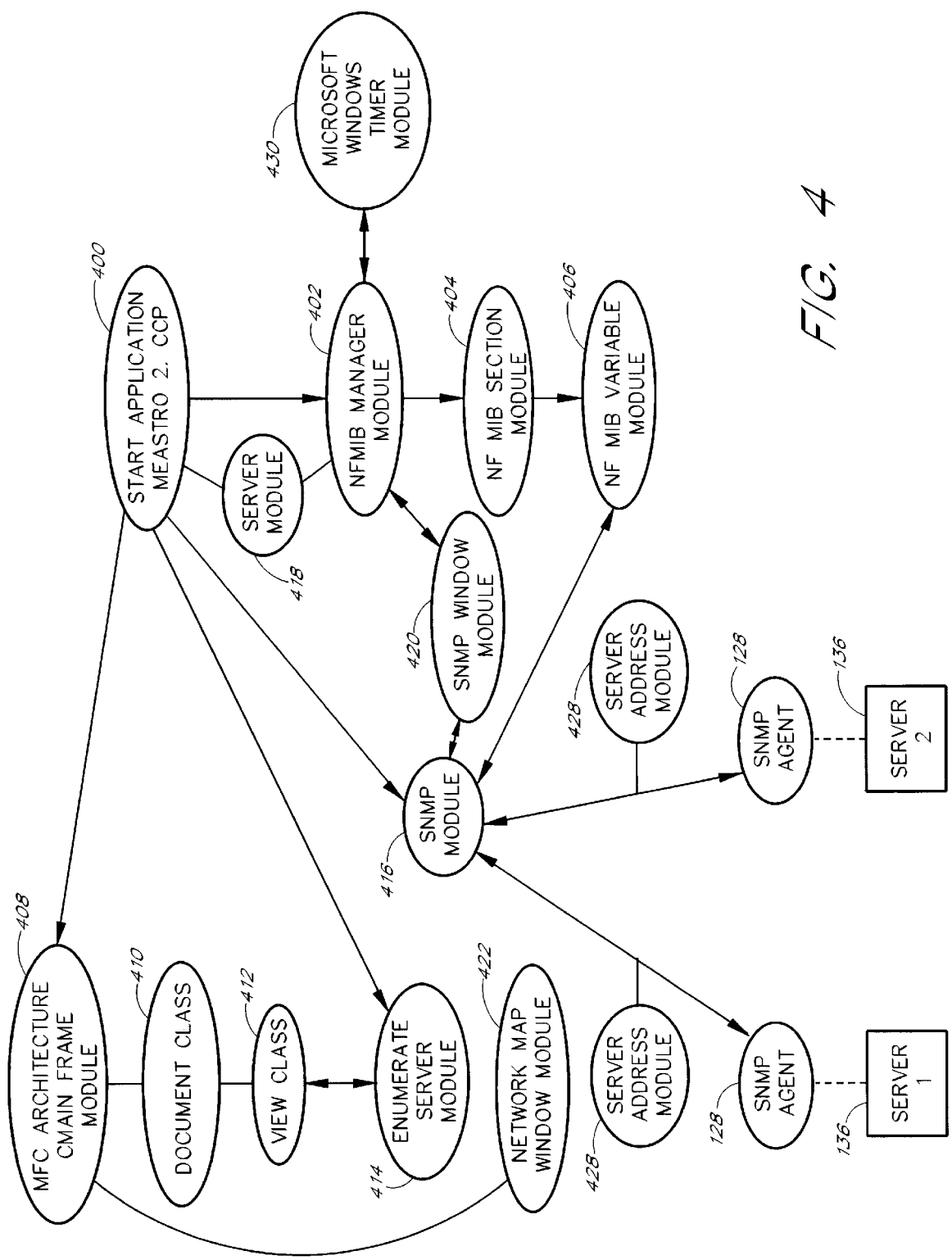
FIG. 4 illustrates a module-level architecture in accordance with one embodiment of the invention.

FIG. 4 illustrates a module-level architecture in accordance with one embodiment of the invention. The "start application" block 400 is the first step where all modules and dialog boxes used for one embodiment of the present invention are created. In one embodiment of the invention, this application is a C++ class file called "maestro2.ccp."

The CMainFrame Class 408 creates all the windows and graphical user interfaces used in one embodiment of the present invention. This is also known as the Microsoft Foundation Class Document/View Architecture. The Document Class 410 keeps the data about the application. The View Class 412 displays to the user a representation of the data kept in the Document Class 410 which is defined by Microsoft Corporation. The use of these classes is explained in more detail in *Inside OLE,* 2d edition, 1995 by Kraig Brockschmidt, which is hereby incorporated herein in its entirety by reference.

The MIB Manager Module 402 may perform a number of functions in one embodiment of the invention. The MIB Manager Module 402 may manage the other modules which retrieve and display MIB data. The MIB Manager Module 402 may contain one or more "retrieve data" functions. In one embodiment, the MIB Manager Module 402 calls the MIB Section Module 404 and the NF MIB Variable Module 406 to retrieve and temporarily store MIB data retrieved from the server 136. The MIB Manager Module 402 may also call other modules to implement the user's changes to read-write MIB variables.

The MIB Section Module 404 may be used to retrieve MIB data contained in a table or organized in a group of variables in one embodiment of the invention. The MIB Section Module 404 may contain "retrieve data" and/or "retrieve table data" functions. The MIB Section Module 404 may also be used to store retrieved MIB data and/or MIB table data.

The MIB Variable Module 406 may be used to retrieve MIB data in one embodiment of the invention. The MIB Variable Module 406 may contain "retrieve variable data" functions. The MIB Variable Module 406 may also be used to store retrieved MIB data.

Figure 19:
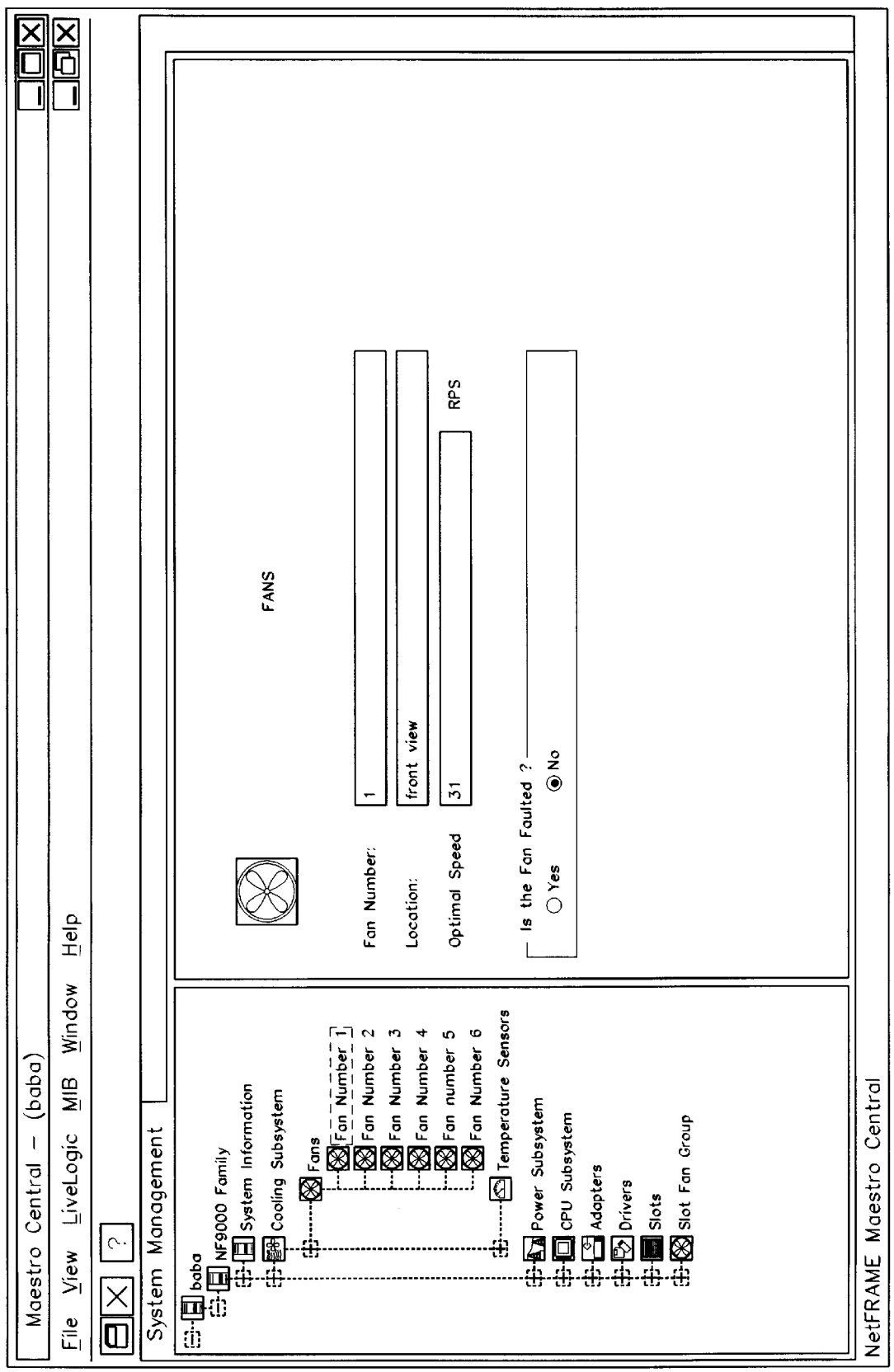
FIG. 19 illustrates one embodiment of a window for a single system board fan device.
Figure 20:
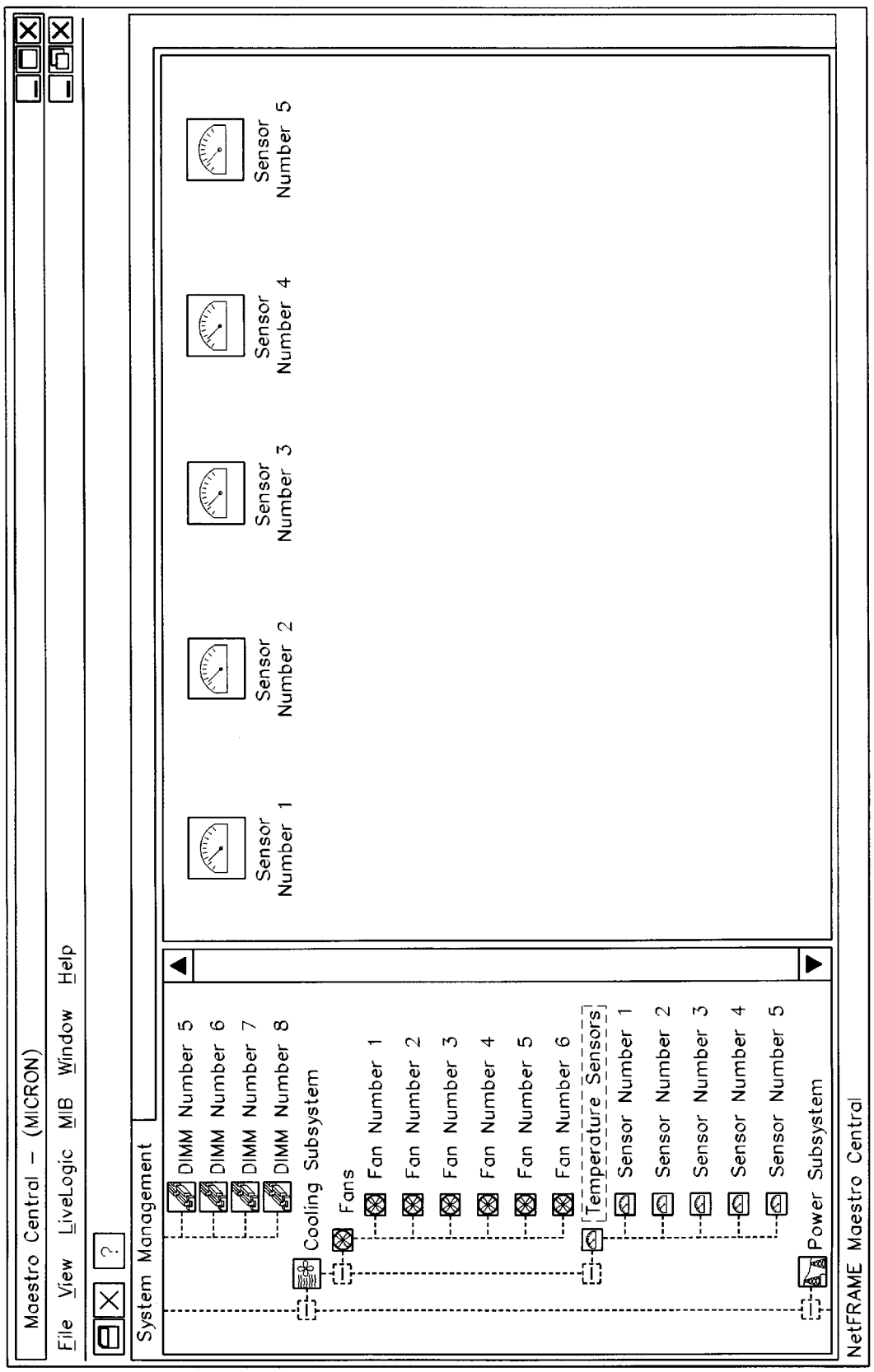
FIG. 20 illustrates one embodiment of a general temperature sensors window.
Figure 21:
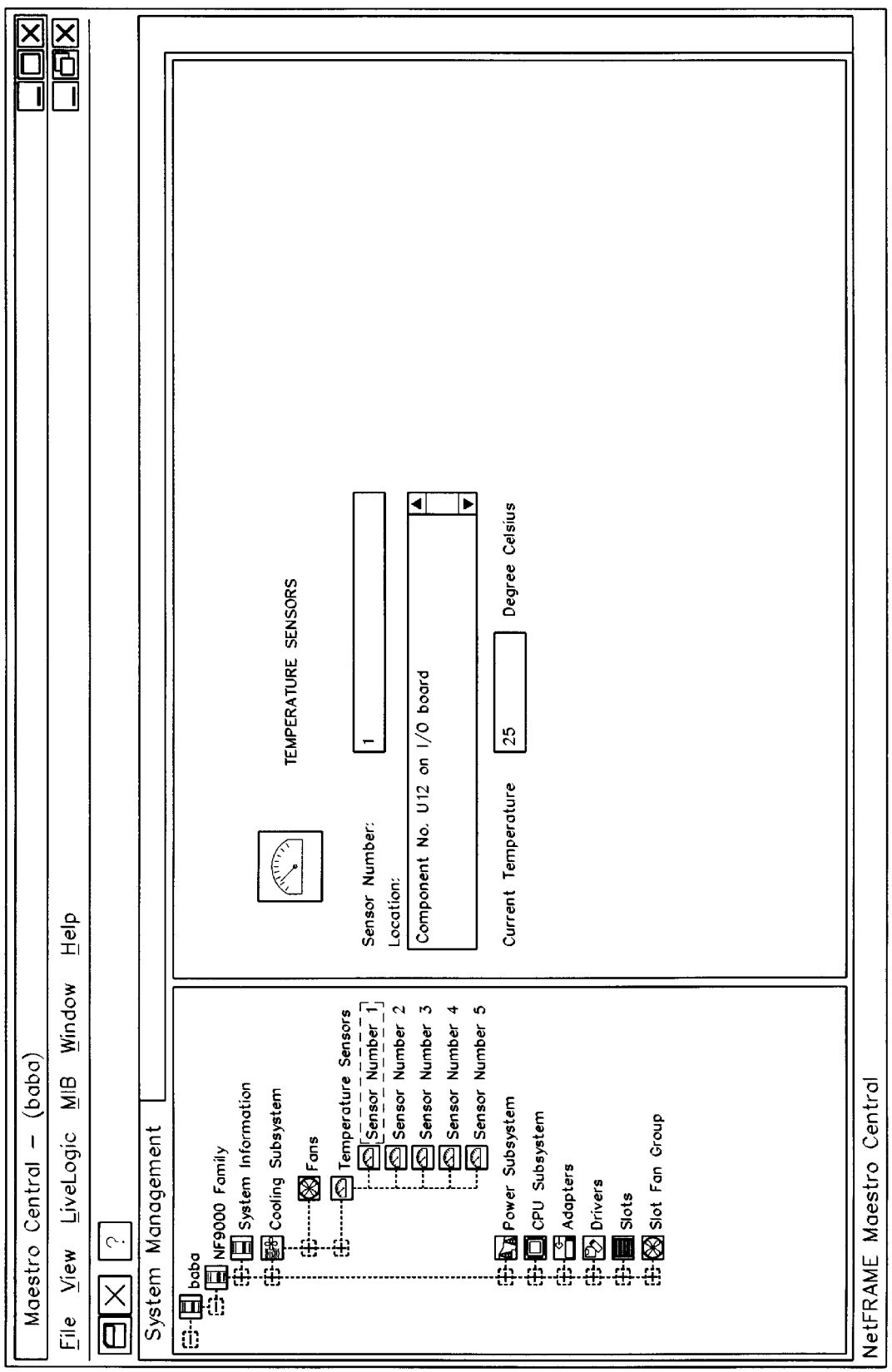
FIG. 21 illustrates one embodiment of a window for a single temperature sensor device.
Figure 22:
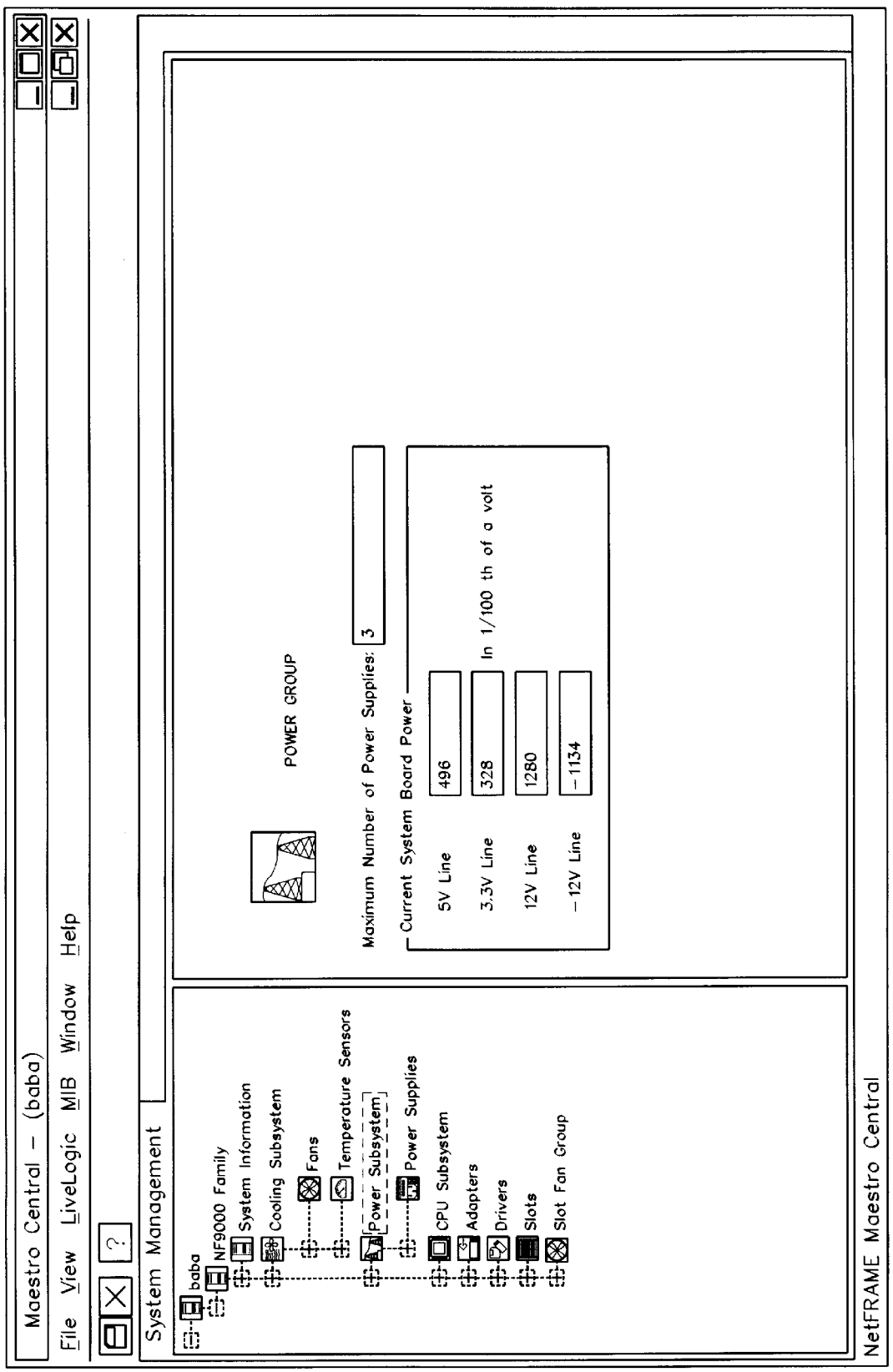
FIG. 22 illustrates one embodiment of a general power subsystem window.
Figure 23:
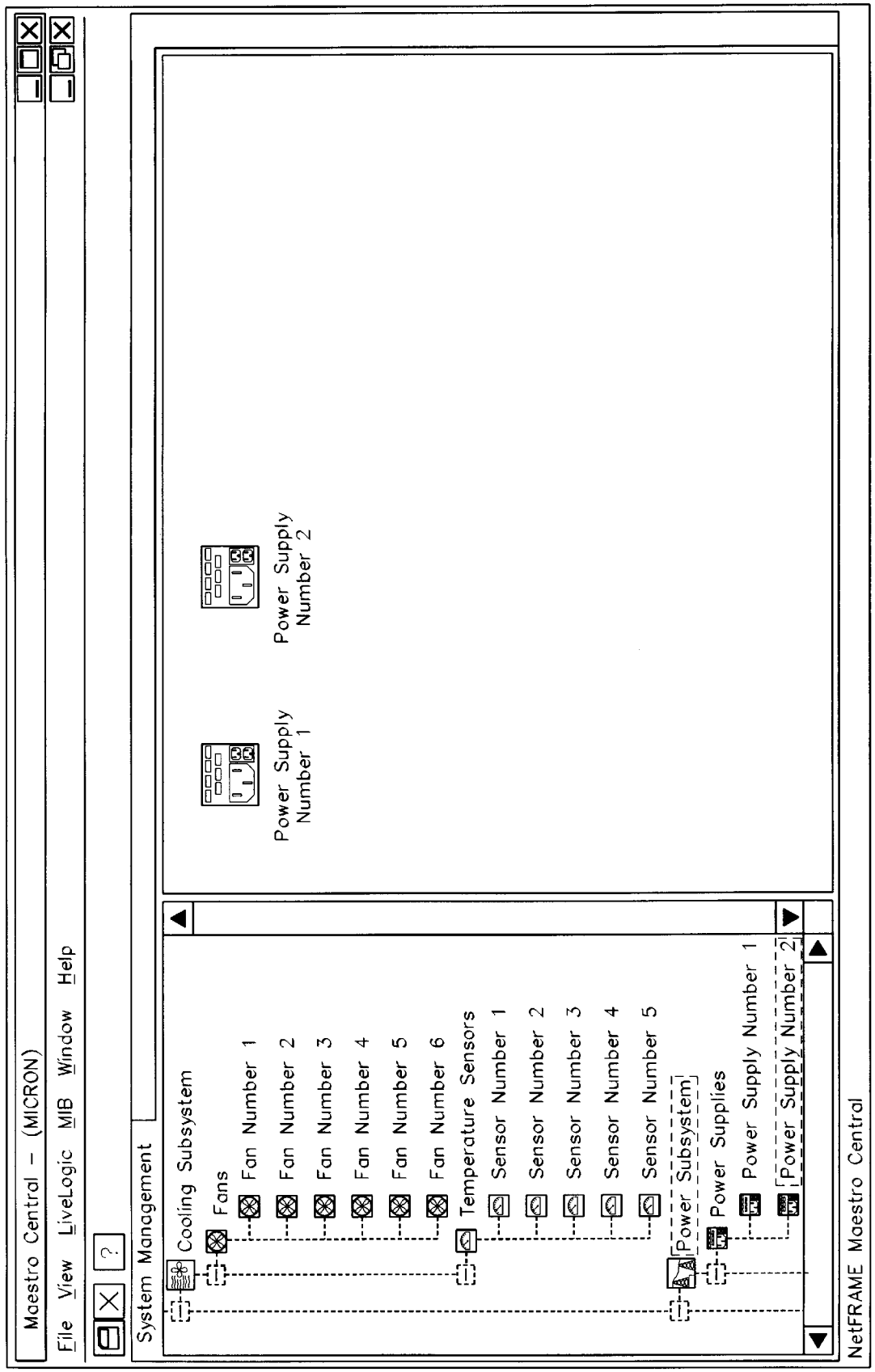
FIG. 23 illustrates one embodiment of a general power supplies group window.
Figure 24:
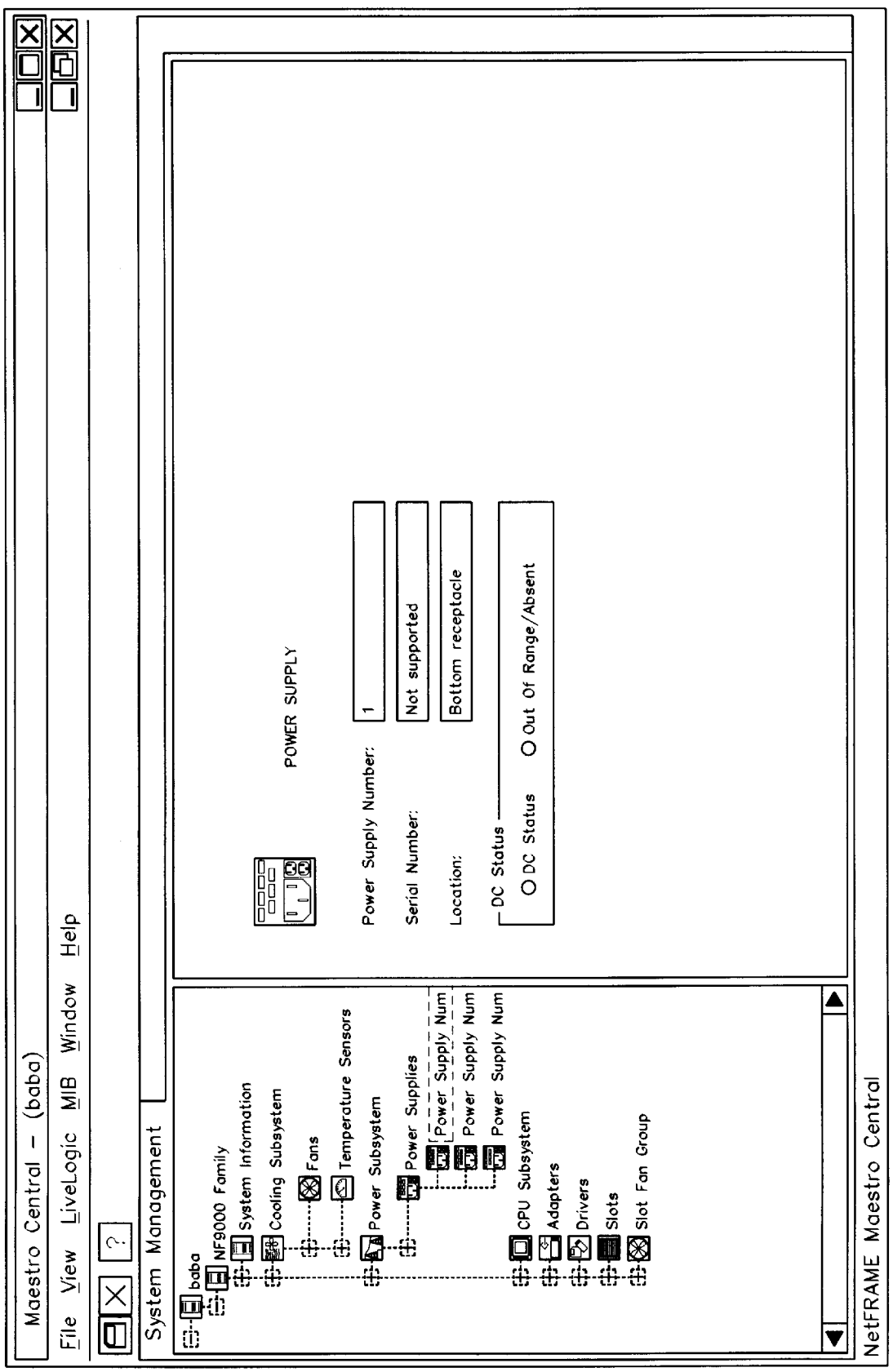
FIG. 24 illustrates one embodiment of a window for a single power supply device.
Figure 25:
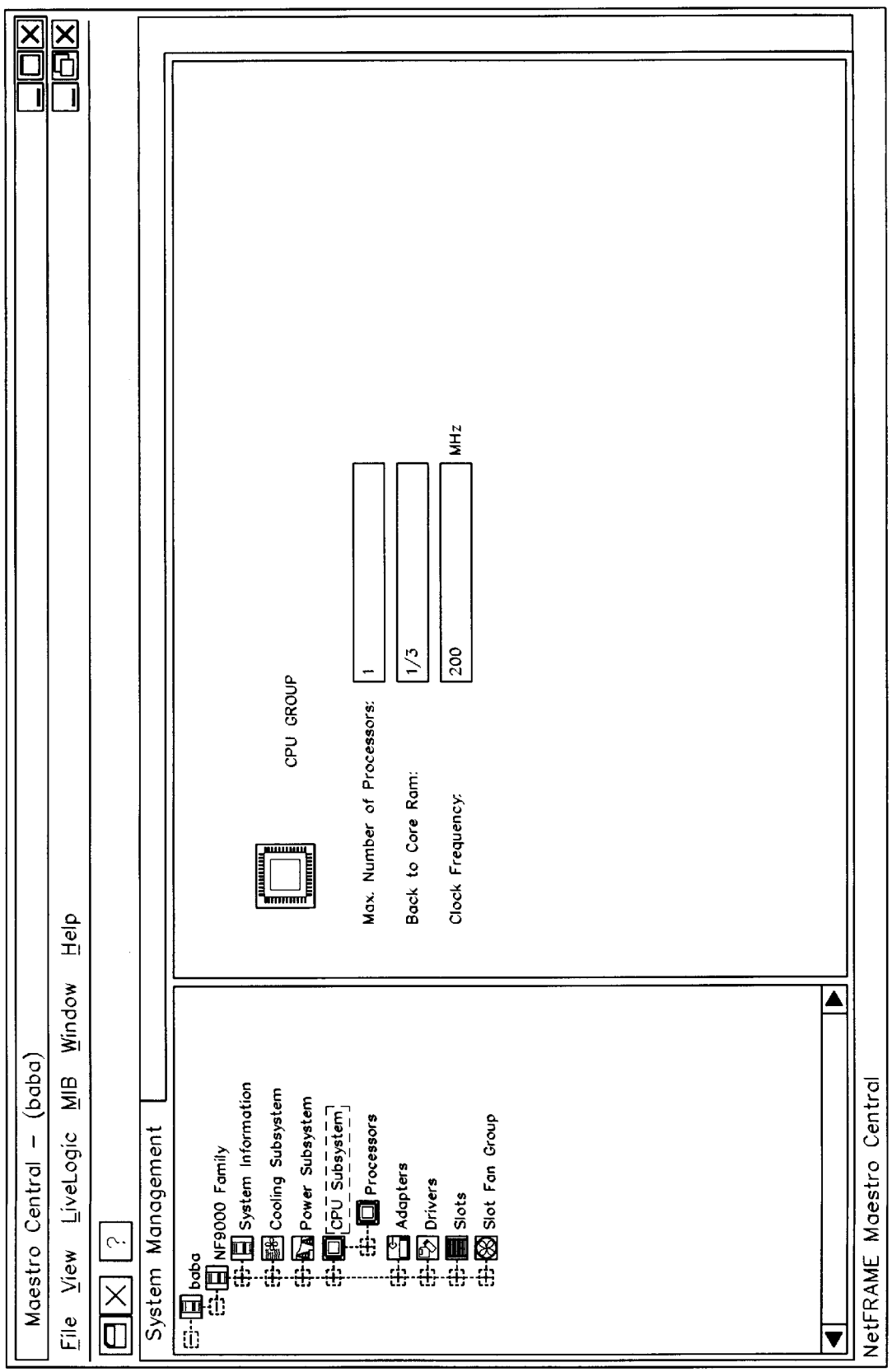
FIG. 25 illustrates one embodiment of a general CPU subsystem window.
Figure 26:
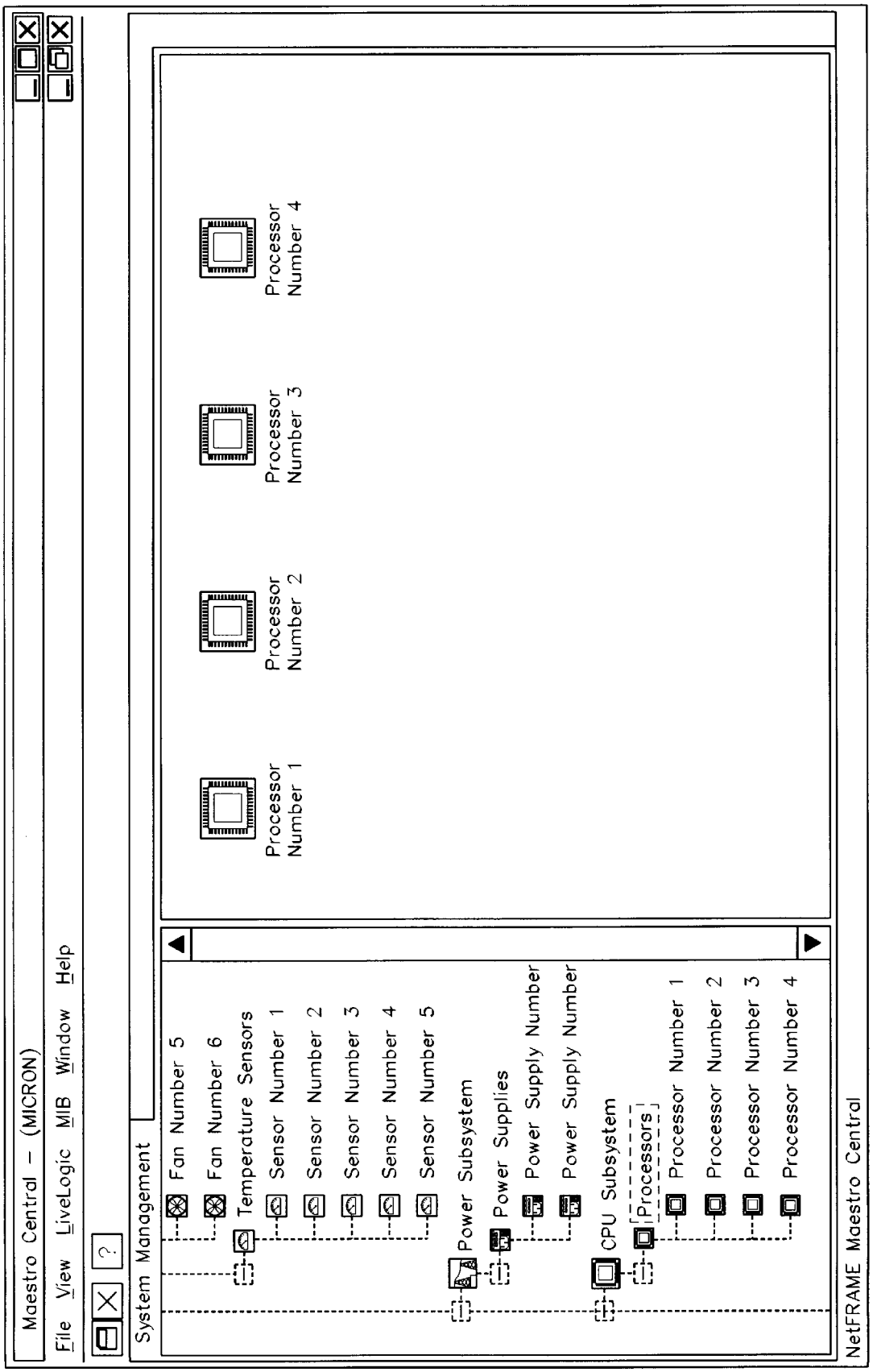
FIG. 26 illustrates one embodiment of a general processors window.
Figure 27:
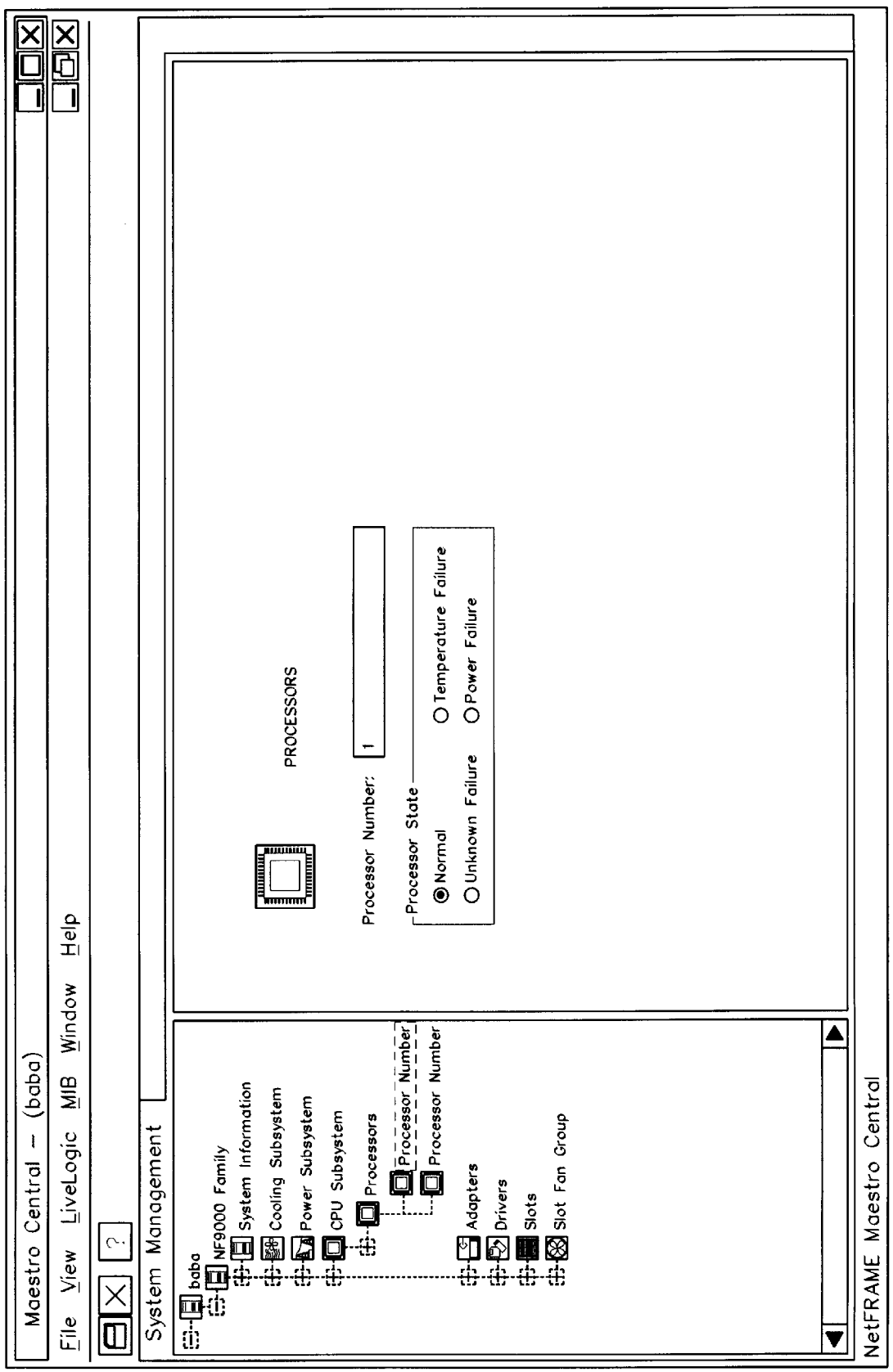
FIG. 27 illustrates one embodiment of a window for a single processor device.
Figure 28:
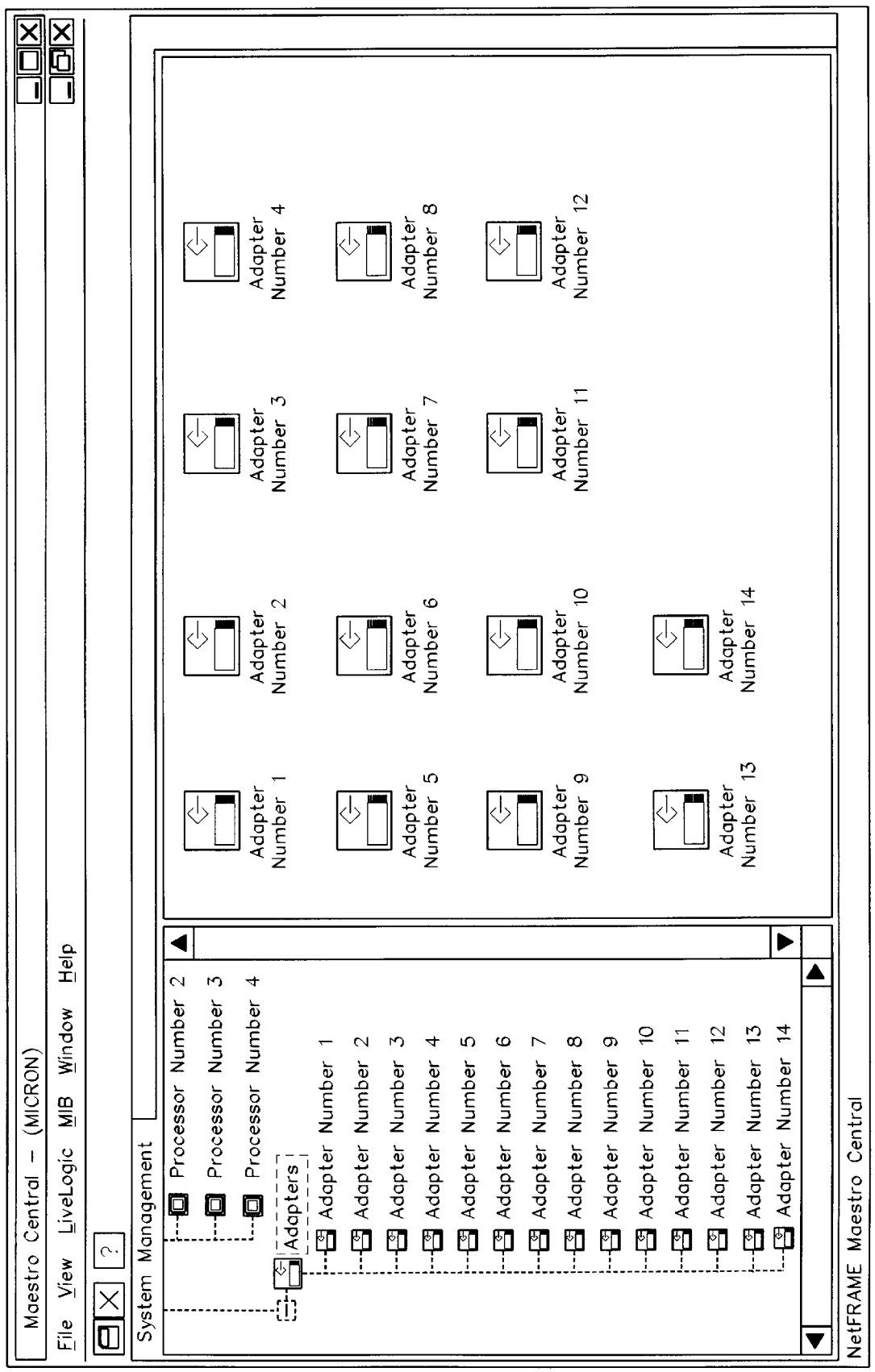
FIG. 28 illustrates one embodiment of a general adapters window.
Figure 29:
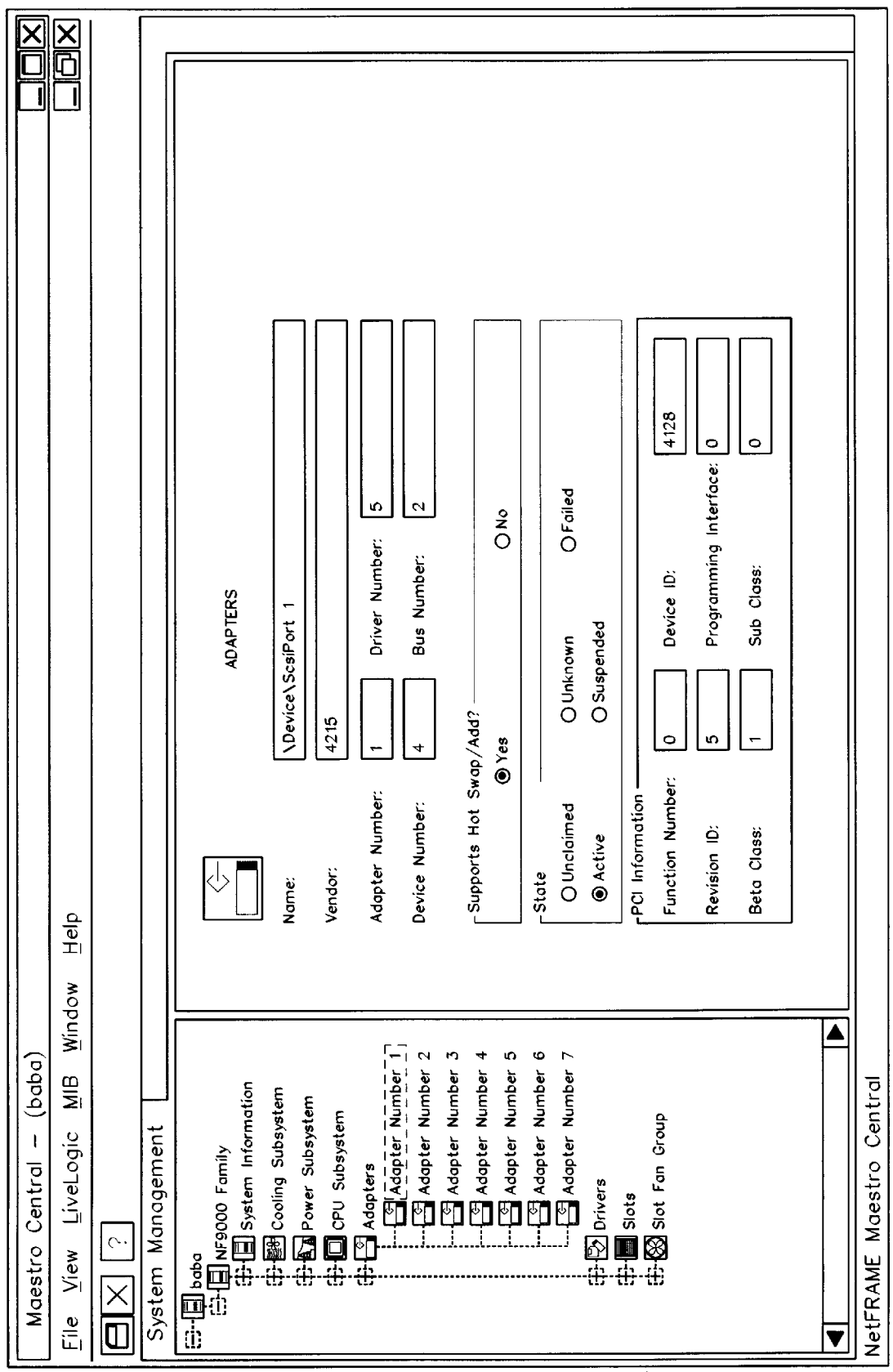
FIG. 29 illustrates one embodiment of a window for a single adapter device.
Figure 30:
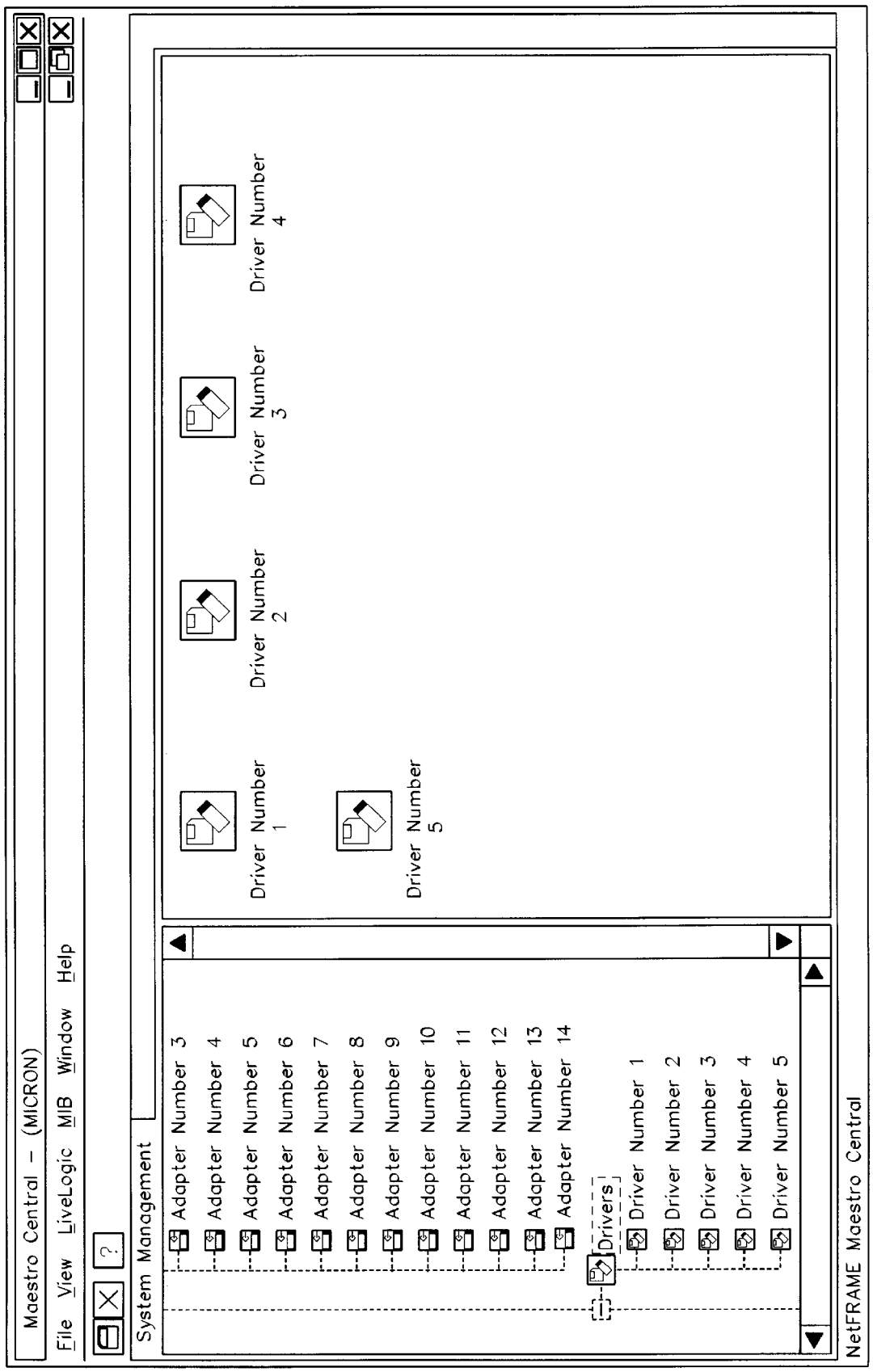
FIG. 30 illustrates one embodiment of a general drivers window.
Figure 31:
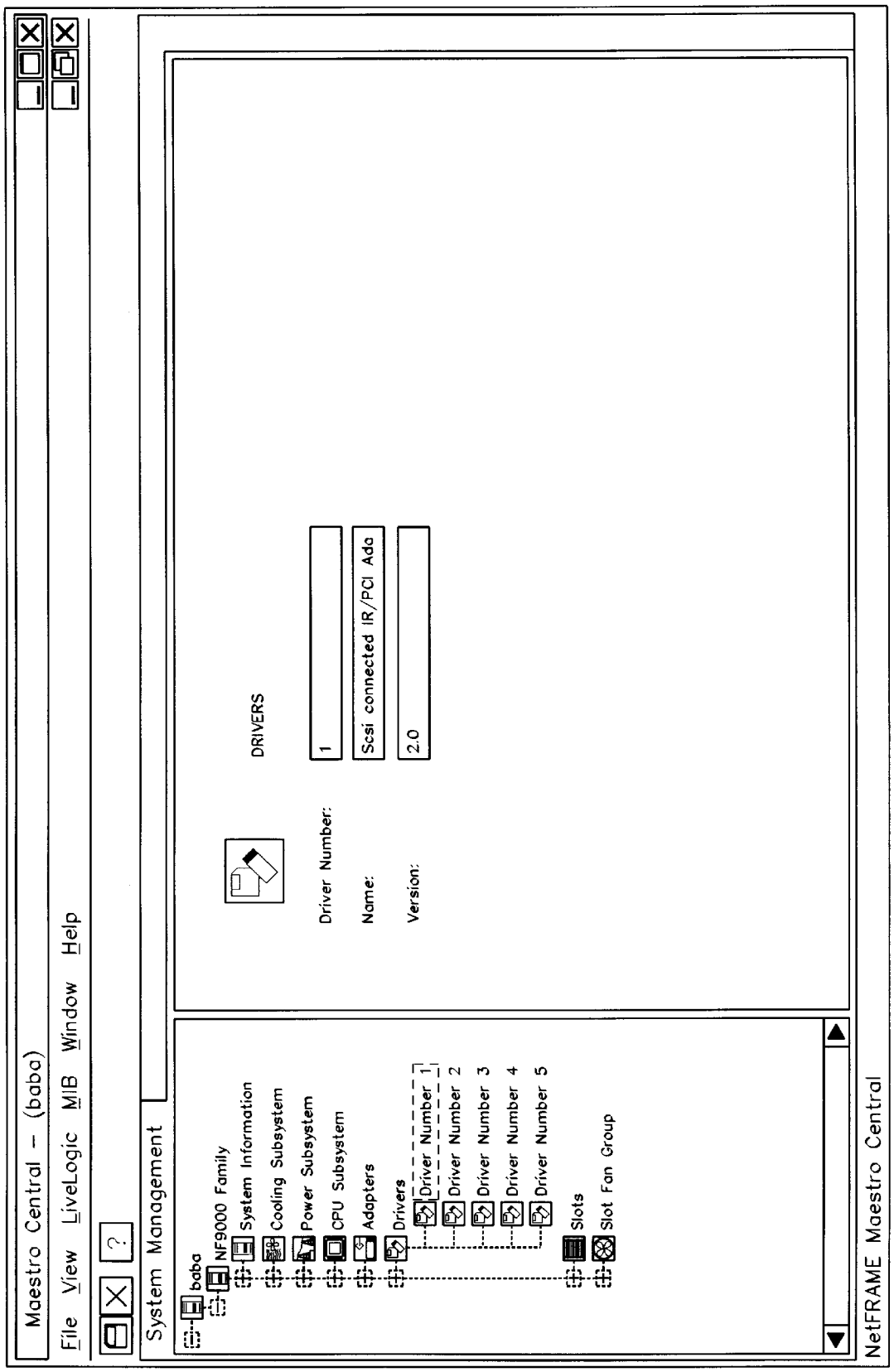
FIG. 31 illustrates one embodiment of a window for a single driver device.
Figure 32:
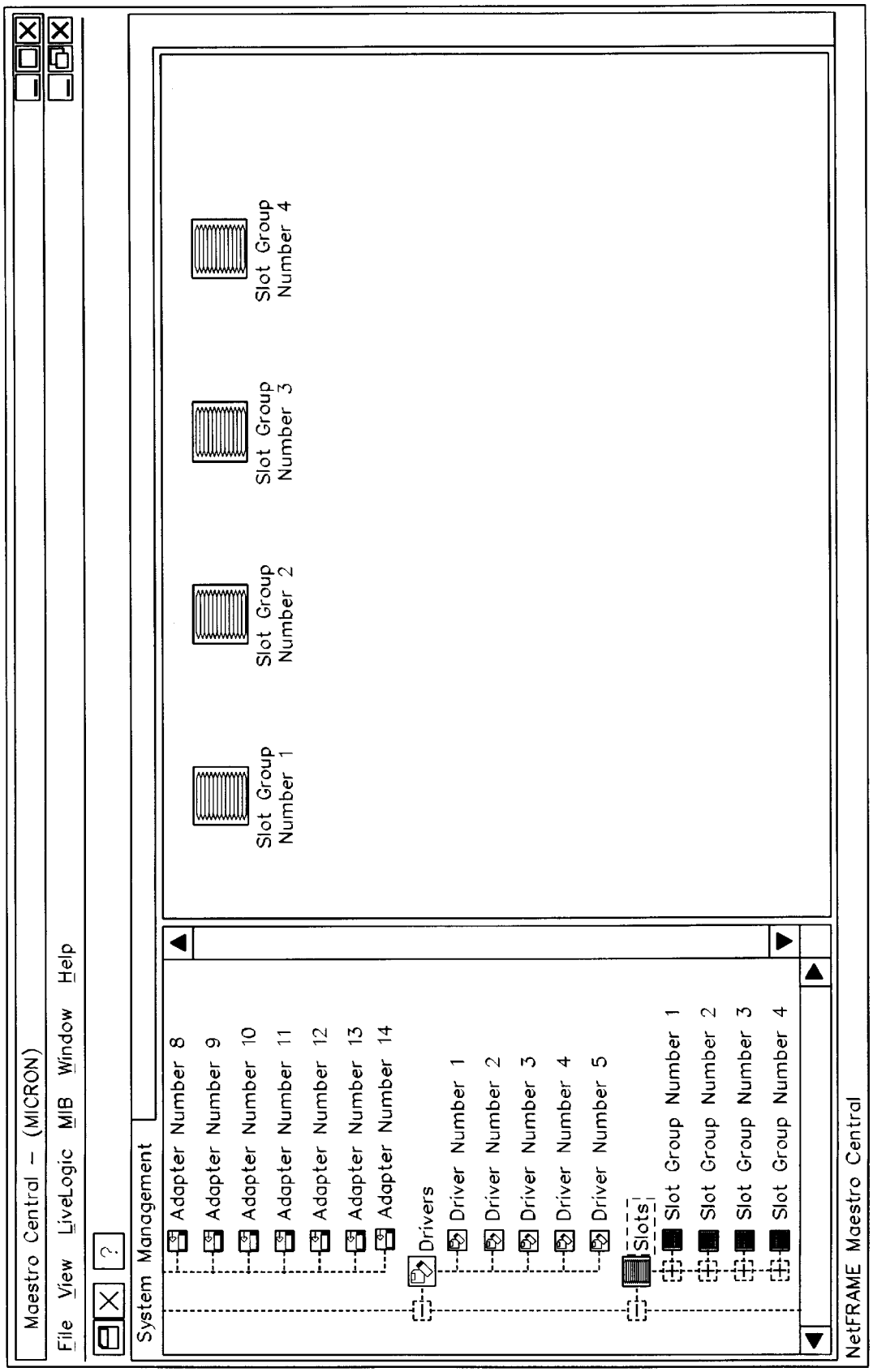
FIG. 32 illustrates one embodiment of a general slot subsystem window.
Figure 33:
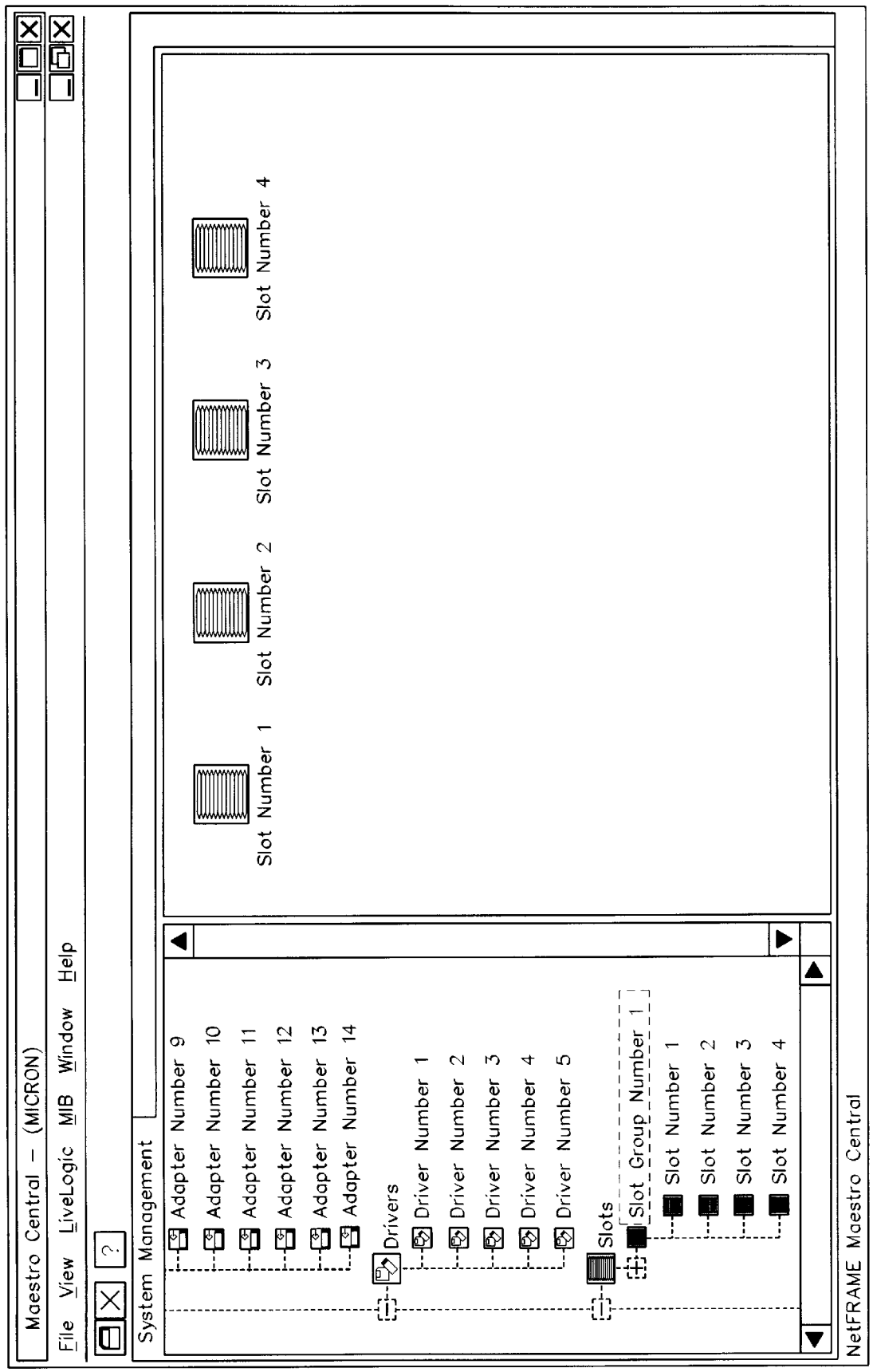
FIG. 33 illustrates one embodiment of a general slot group window.
Figure 34:
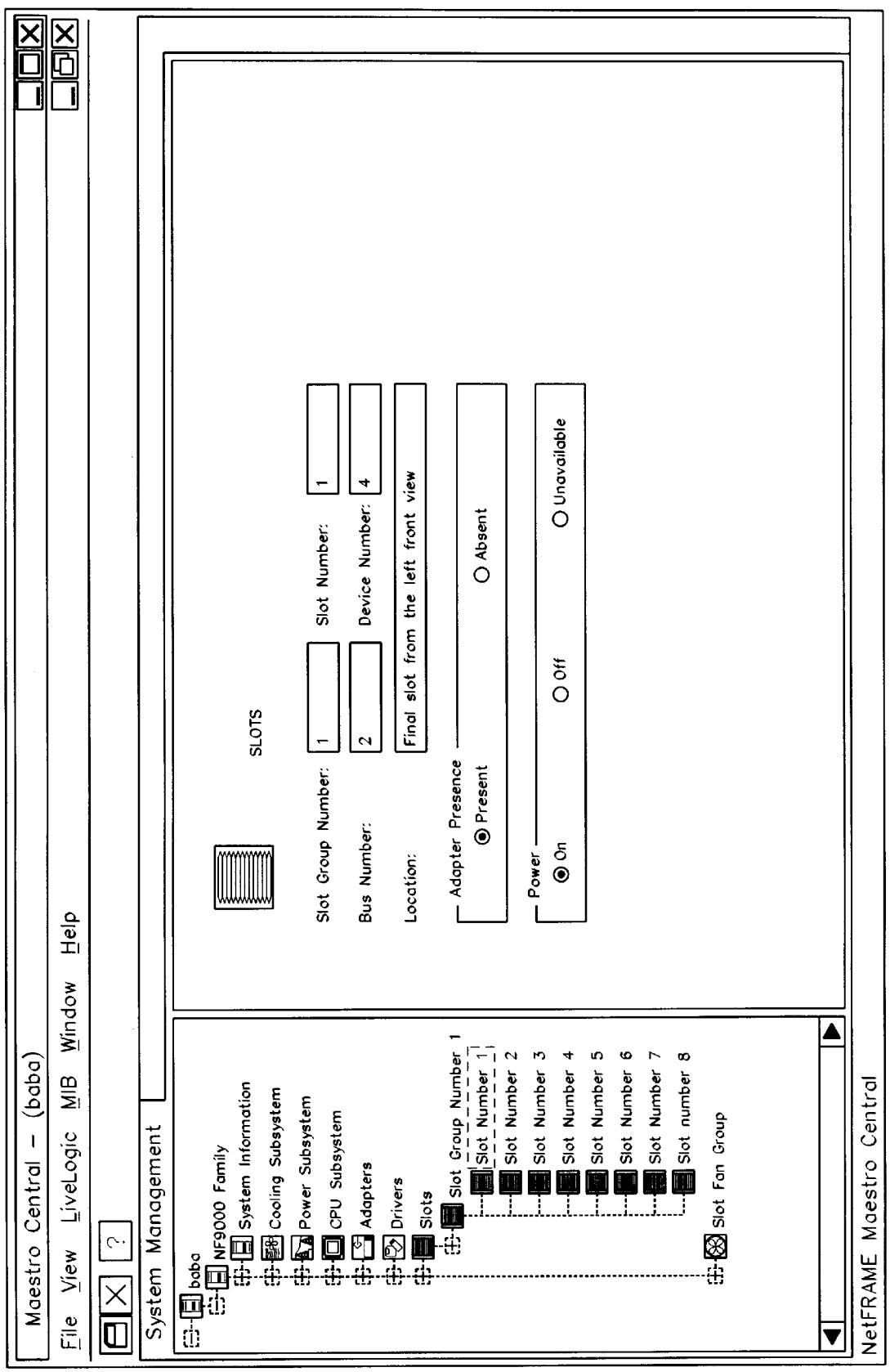
FIG. 34 illustrates one embodiment of a window for a single slot device.
Figure 35:
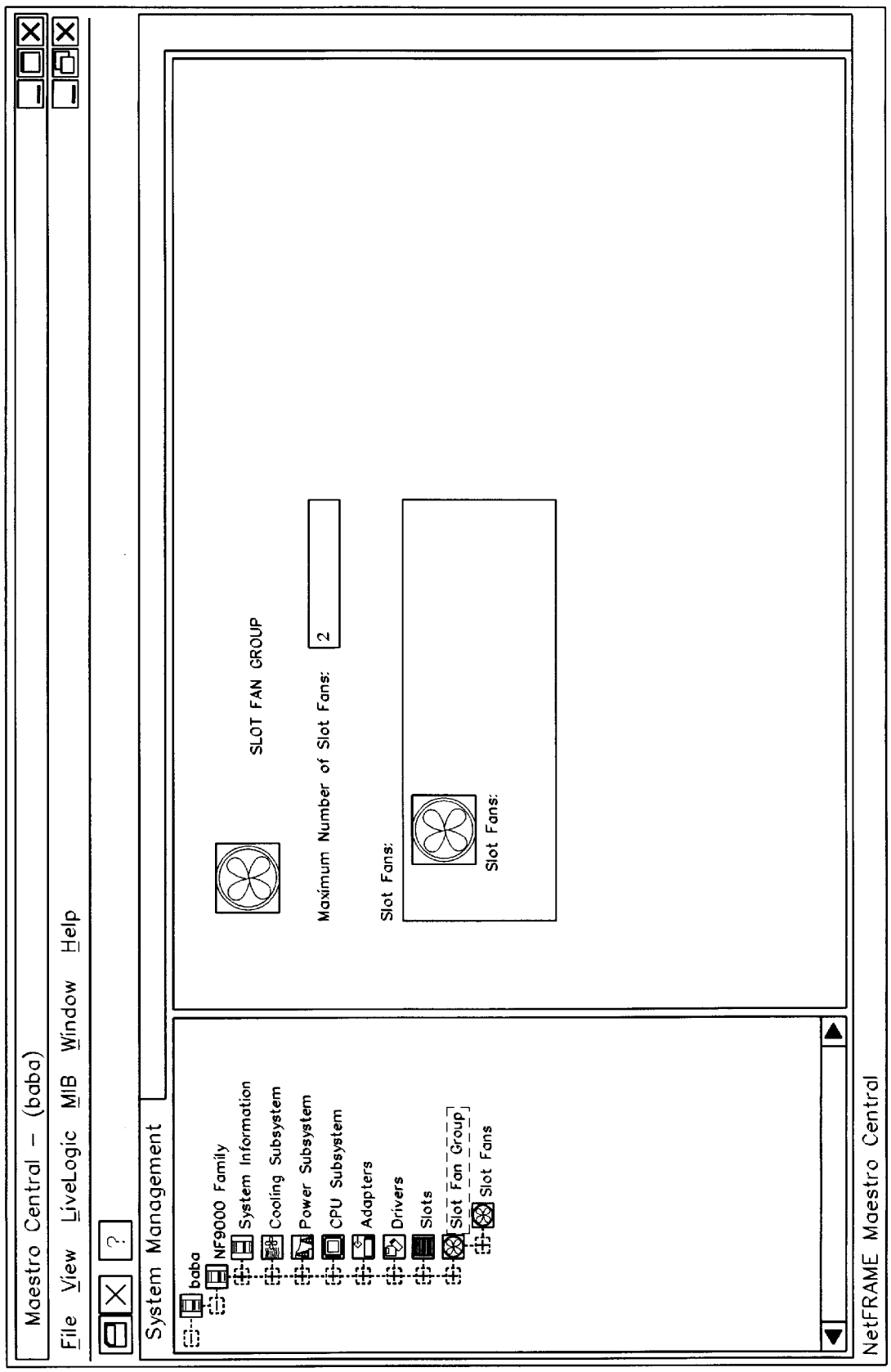
FIG. 35 illustrates one embodiment of a general slot fans group window.
Figure 36:
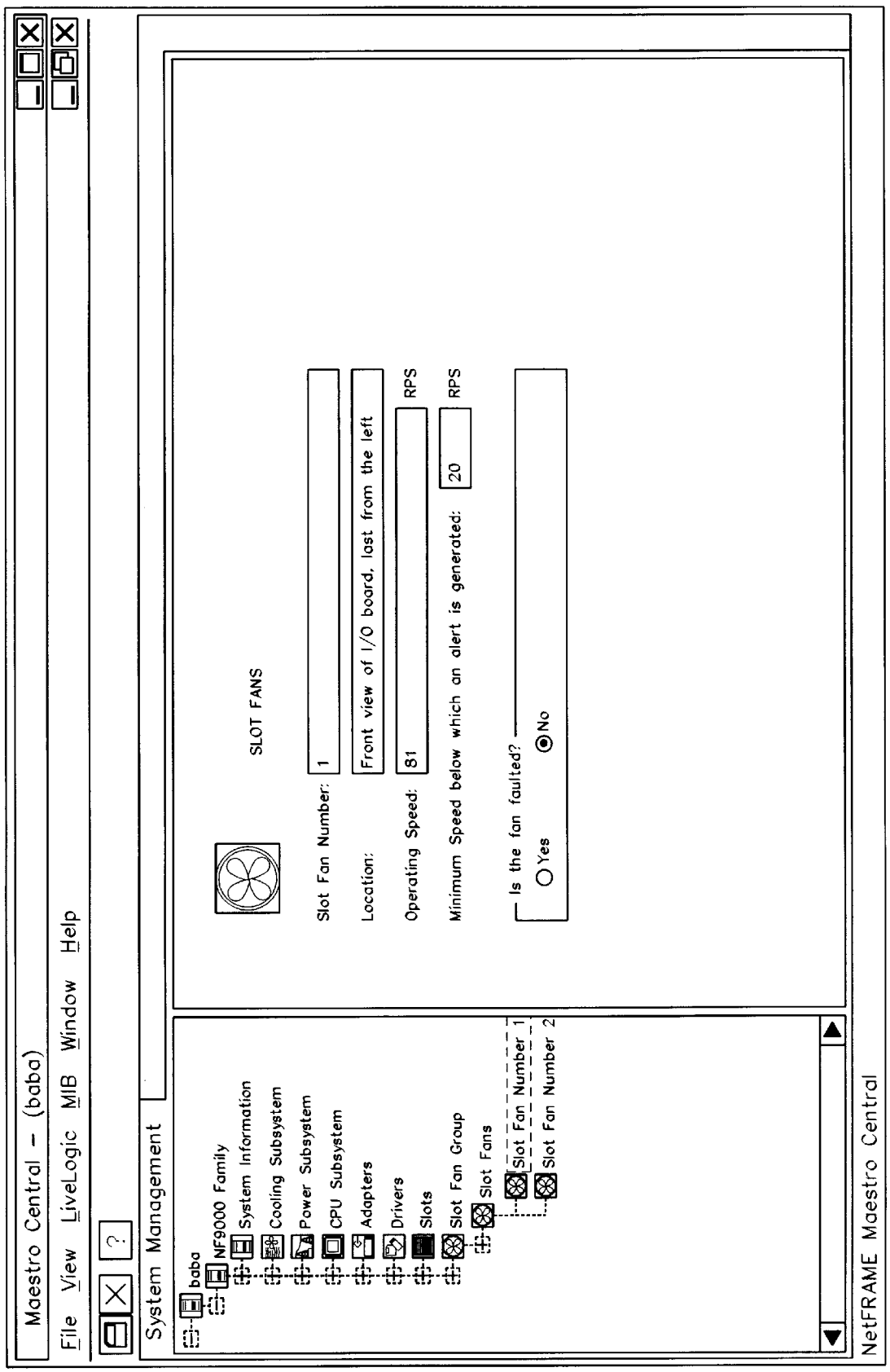
FIG. 36 illustrates one embodiment of a window for a single slot fan device.
Figure 37:
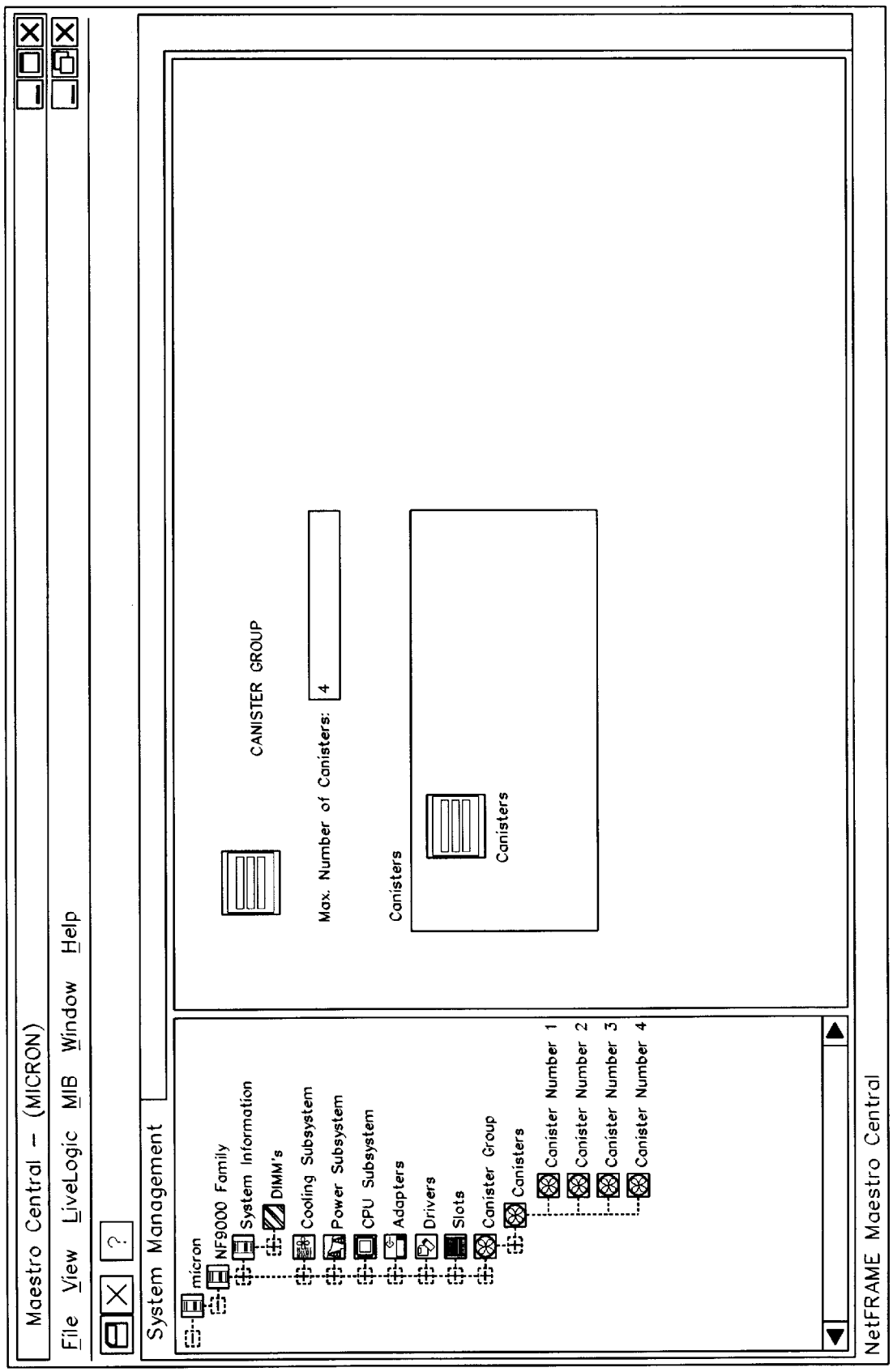
FIG. 37 illustrates one embodiment of a general canister group window.
Figure 38:
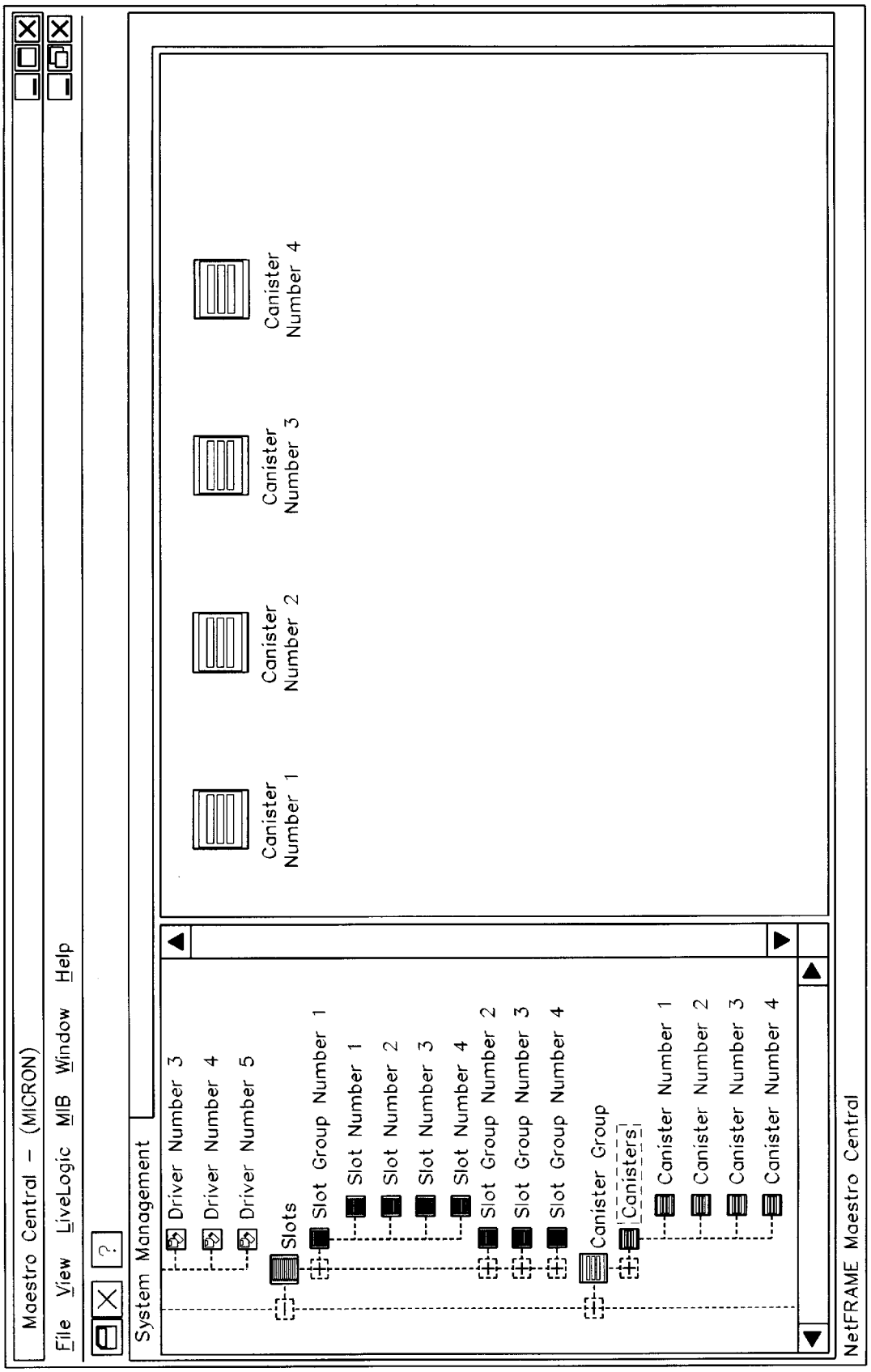
FIG. 38 illustrates one embodiment of a general canister subgroup window.
Figure 39:
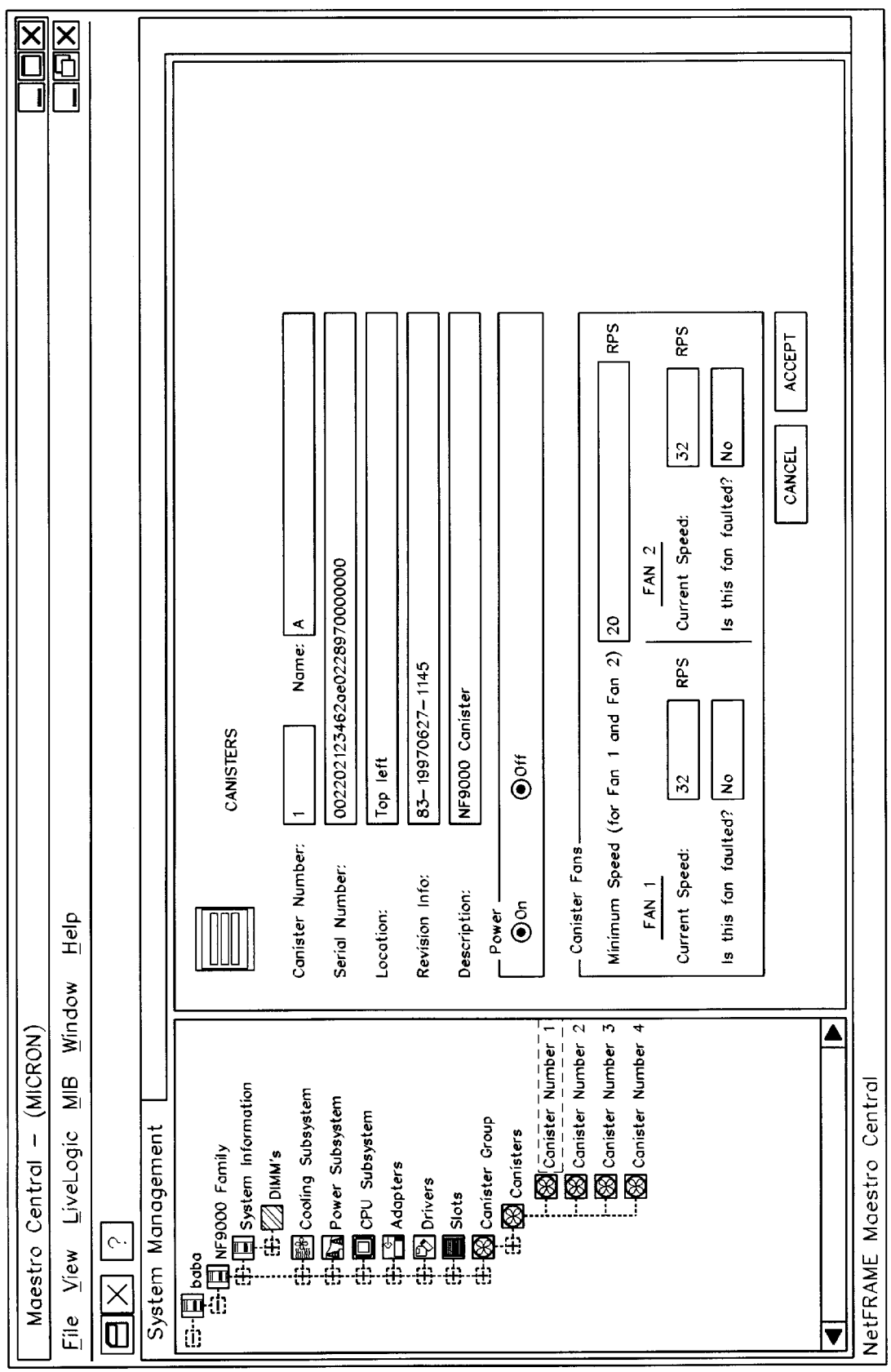
FIG. 39 illustrates one embodiment of a window for a single canister device.

The Microsoft Windows NT/95 Timer Module 430 may be used to set the time interval between each data retrieval from the server 136 in one embodiment of the invention. This is useful for dynamic variables such as fan speed. In one embodiment of the invention, the Timer Module 430 is used to set the interval between retrievals for data that is not currently being displayed to the user. For example, if the user is viewing the fan speed for fan number 1, as shown in FIG. 19, then the temperature detected by temperature sensor number 1, as shown in FIG. 21, is not currently being displayed to the user. The user may configure the time interval between data retrievals from temperature sensor number 1 by going to the "Window" menu 514 and pulling down the menu item "User Options." This opens a User Options dialog box which allows the user to make the change. The user may change the data retrieval time interval for all MIB variables not currently being displayed. In one embodiment of the invention, the user may configure this interval to a desired time duration, such as a half hour, an hour, etc.

The Server Module 418 may contain information about the server 136 in one embodiment of the invention. The Server Module 418 may contain information on how to display the server 136 as an icon on the System Management Window 602 in one embodiment of the invention.

Figure 5:
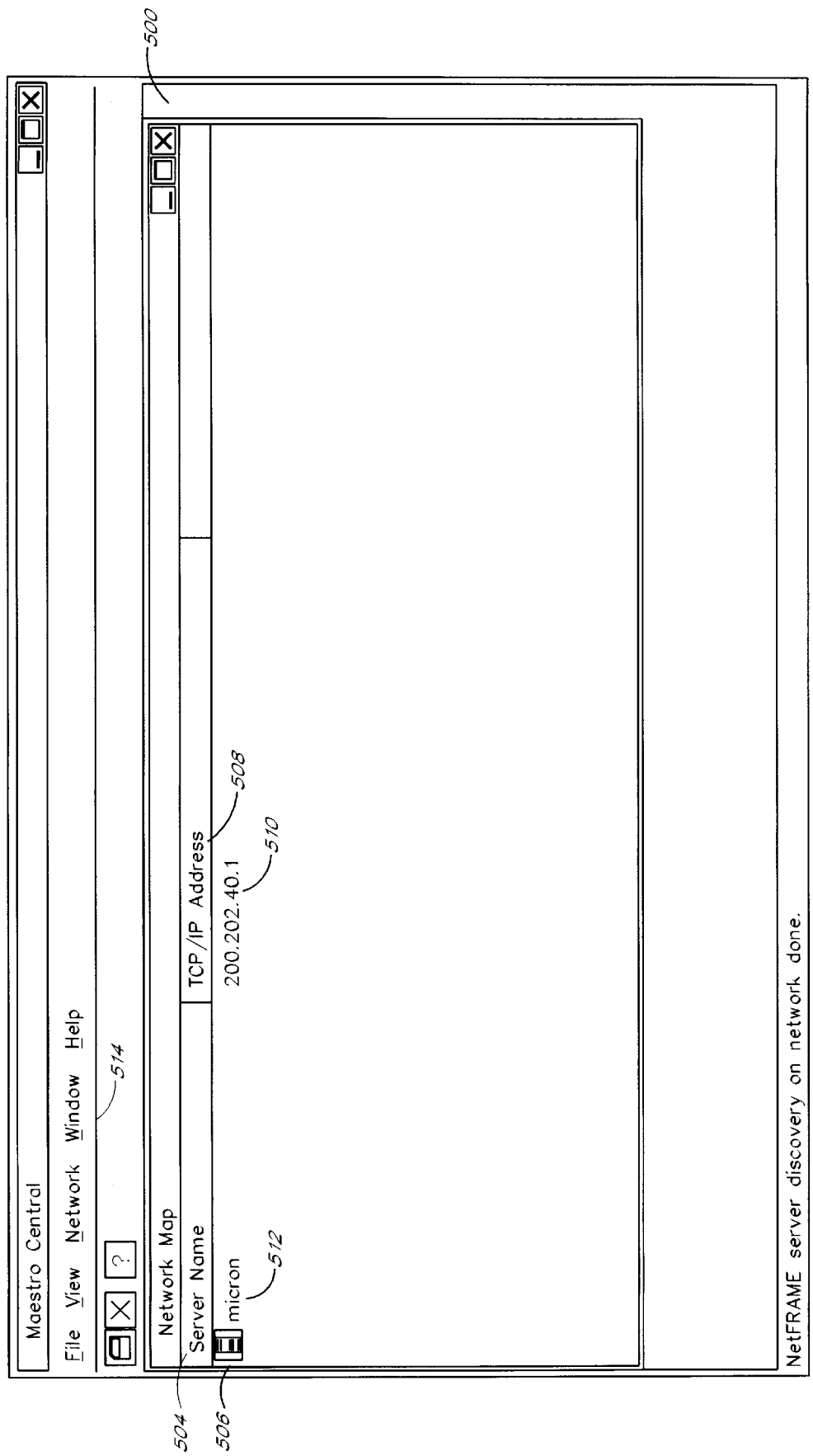
FIG. 5 illustrates a network map window in one embodiment of the claimed invention.

The Network Map Window Module 422 may perform a number of functions in one embodiment, including displaying the Network Map Window 502 and each server 136 in the network as an icon 506 in the Network Map Window 502 as shown in FIG. 5. The Network Map Window Module 422 may call the EnumServer Module 414 to discover the names and number of servers 136 in the network 120.

The EnumServer Module 414 discovers and identifies the number of servers 136 in the system in one embodiment of the invention. The EnumServer Module 414 may store information in the memory of the microprocessor 102. The EnumServer Module 414 is a local module, but it is global in the sense that it is accessible from anywhere in the system. For example, if there are multiple servers, the EnumServer Module 414 may act as a repository of server information.

The SNMP Module 416 is a class that encapsulates all the SNMP functions used by one embodiment of the present invention, such as "GET," "GET NEXT," and "SET." The GET function is typically used by the SNMP agent 128 to retrieve non-table SNMP MIB data from the server 136 in response to a request by the SNMP manager 108.

The GET NEXT function is typically used to retrieve more than one variable, such as a table of variables. In one embodiment of the invention, it is difficult for the SNMP manager 108 to predict the number of entries in a MIB table. The GET NEXT function gets the value of the variable requested by the user and also the object identifier of the next variable. Often, a loop is created with GET NEXT until all requested values are retrieved. If all variables in a table are retrieved, the GET NEXT function returns an object identifier that is "outside" the table. The SNMP manager 108 uses this value to determine if it has completed retrieving all data that is in a table. The SET function is used by the SNMP manager 108 to change values of MIB variables stored on the SNMP agent 128.

In one embodiment of the invention, the MIB 110 contains a hierarchal collection of variables related to the hardware and software components of the server 136. Using the MIB variables, the SNMP manager 108 (more specifically, the SNMP Module 204) creates an information request which is sent to the SNMP agent 128. In one embodiment of the invention, the server is a NF9000 server. A SNMP MIB for the NF9000 series is set forth in Appendix B.

The SNMP Window Module 420 is used to pass messages among applications. The SNMP Window Module 420 allows an application, such as a system manager, to communicate with the SNMP module 204. The use and operation of an SNMP Window Module 420 is well known to those of ordinary skill in the art.

Creating and Displaying the Network Map Window 502

Figure 7:
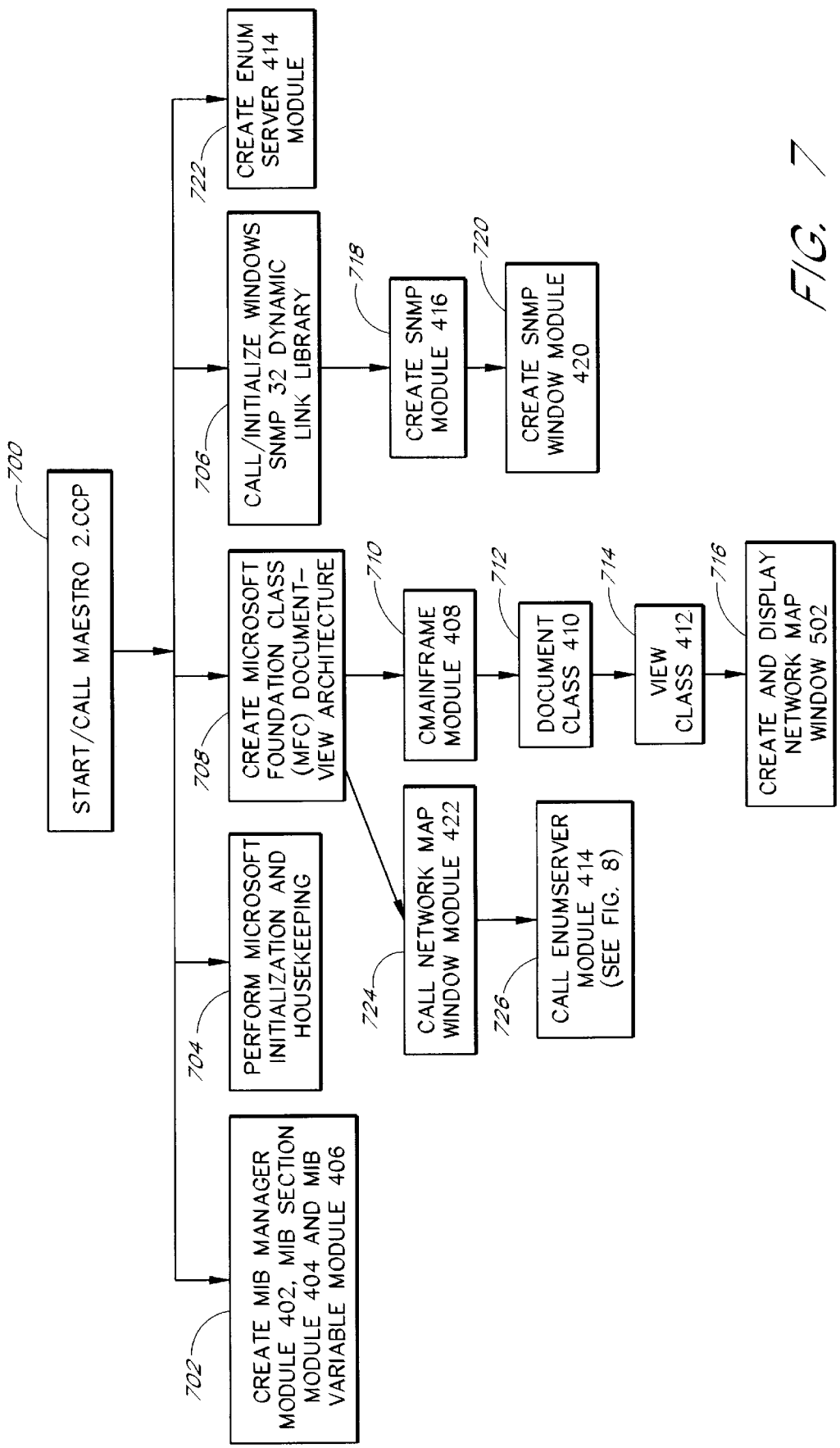
FIG. 7 illustrates the process of creating a network map window in one embodiment of the invention.

FIG. 7 illustrates the start application process in one embodiment of the invention. To start the application, the user activates "maestro2.ccp" (herein referred to as "Maestro" 400), a C++ class file.

Maestro 400 calls standard Microsoft initialization modules to perform standard housekeeping functions. This is shown in block 704. Maestro 400 also calls or initializes a standard dynamic link library (DLL) such as the Windows SNMP (WinSNMP) DLL (WinSNMP Library) 706 manufactured by American Computer Electronic Corporation. The WinSNMP Library is used to do SNMP transactions while an application, such as Maestro 400, is running. DLLs execute under the Microsoft Windows NT or Windows 95 operating systems.

Maestro 400 creates (1) a Microsoft Foundation Class Document/View Architecture (MFC Doc/View Architecture) 408 shown in block 708; (2) an EnumServer Module 414 shown in block 722 and FIG. 8; (3) an SNMP Module 416 shown in block 718; (4) a MIB Manager Module 402; (5) a MIB Section Module 404; and (6) a MIB Variable Module 406. These modules are further explained in detail.

The MFC Doc/View Architecture shown in block 708 creates all the windows and graphical user interfaces used in one embodiment of the present invention. Specifically, the CMainFrame Class 408 creates the Document Class 410 in block 712 and the View Class 412 in block and 714. As described above, the Document Class 410 keeps the data about the application, and the View Class 412 displays to the user a representation of the data kept in the Document Class 410. The CMainFrame Class 408 creates the actual Network Map Window 502 and System Management Window 600 and its associated forms as shown in FIGS. 14 through 39. FIG. 5 illustrates the Main Window 500 in one embodiment of the invention and the Network Map Window 502 where the user may access the system manager application.

Figure 8:
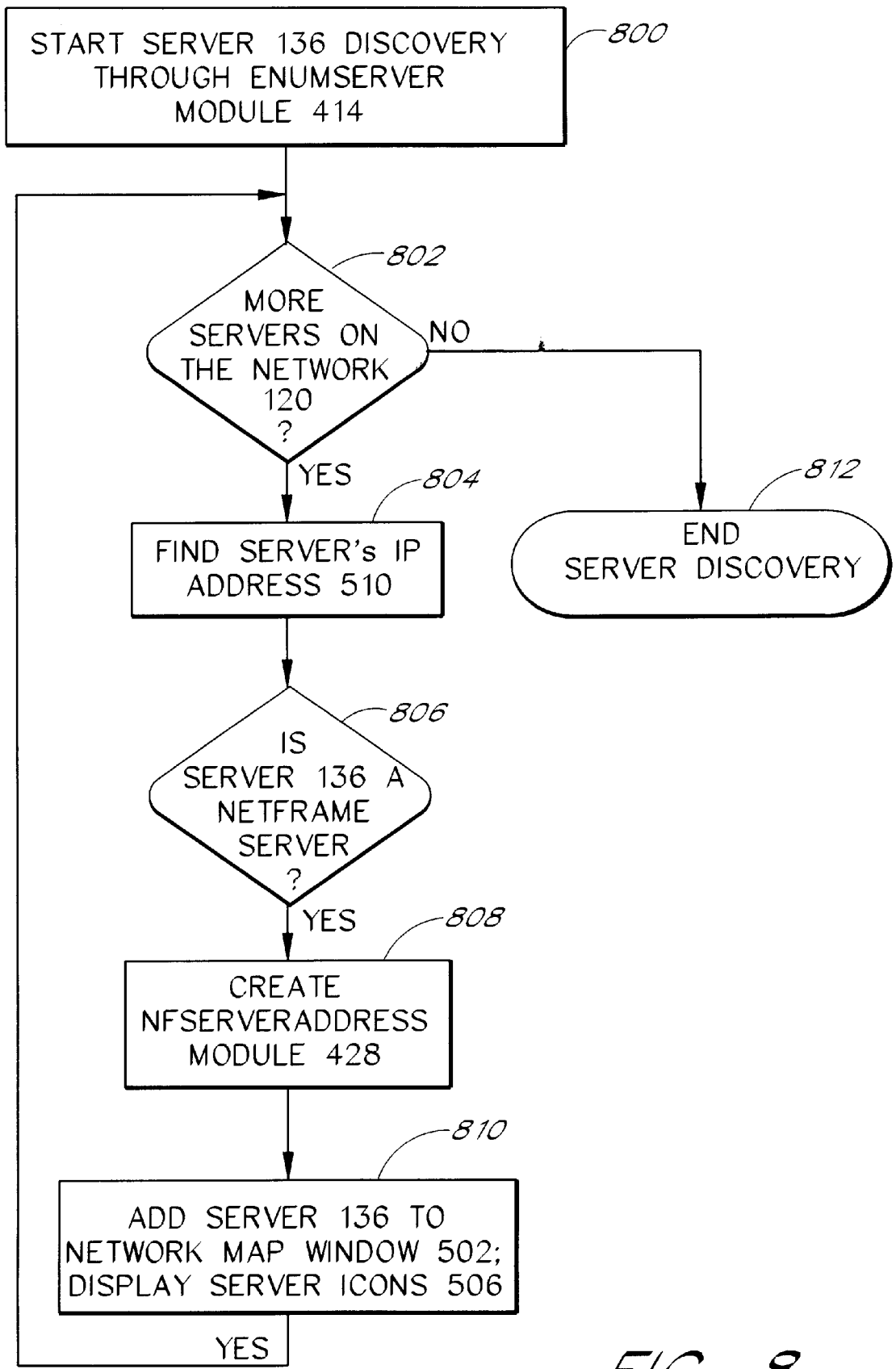
FIG. 8 illustrates the process of identifying network servers in one embodiment of the present invention.

The Network Map Window Module 422 calls the EnumServer Module 414 to discover the number of servers 136 in the network 120 and the names of each server 136. This is shown in FIG. 8. In block 802, the EnumServer Module 414 keeps looking for servers 136 on the network 120 until all are found. In one embodiment of the invention, the EnumServer Module 414 looks for NetFrame servers and creates a Server Address Module 428 for each NetFrame server. This is shown in blocks 804 through 808. After the EnumServer Module 414 finds the name and address of a server 136, the Network Map Window Module 422 displays the name 512 and the address 510 of the server 136 on the Network Map Window 502. This is shown in block 810. When there are no more servers on the network 120, the EnumServer Module 414 ends its discovery process, as shown in block 812.

Maestro 400 also creates an SNMP Module 416 in block 718. The SNMP Module 416 creates an SNMP Window Module 420 as shown in block 720. In one embodiment of the invention, the SNMP Window Module 420 may be used by the WinSNMP Library and Microsoft Windows to pass messages between applications. The WinSNMP Library uses a window to transact SNMP messages. In one embodiment of the invention, Maestro 400 may use a 'hidden' window, which is not visible on the user's desktop while the application is running. The SNMP Window Module 420 allows an application, such as a system manager, to communicate with the SNMP itself.

Maestro 400 also creates the EnumServer Module 414 shown in block 722. The EnumServer Module 414 is empty at this point, but it is made global for future access from anywhere in the system. When the application is running, there may be certain information that is constantly extrapolated by different parts of the system. For example, there may be multiple servers that require the same or similar data. This information is stored locally in a central location such as the EnumServer Module 414. Thus, the EnumServer Module 414 acts as a repository.

In one embodiment of the present invention, the EnumServer Module 414 discovers the names and the numbers of NetFRAME servers on the network and stores this information in an EnumServer Module list as shown in block 808.

Creating and Displaying the System Management Window 600

Figure 9:
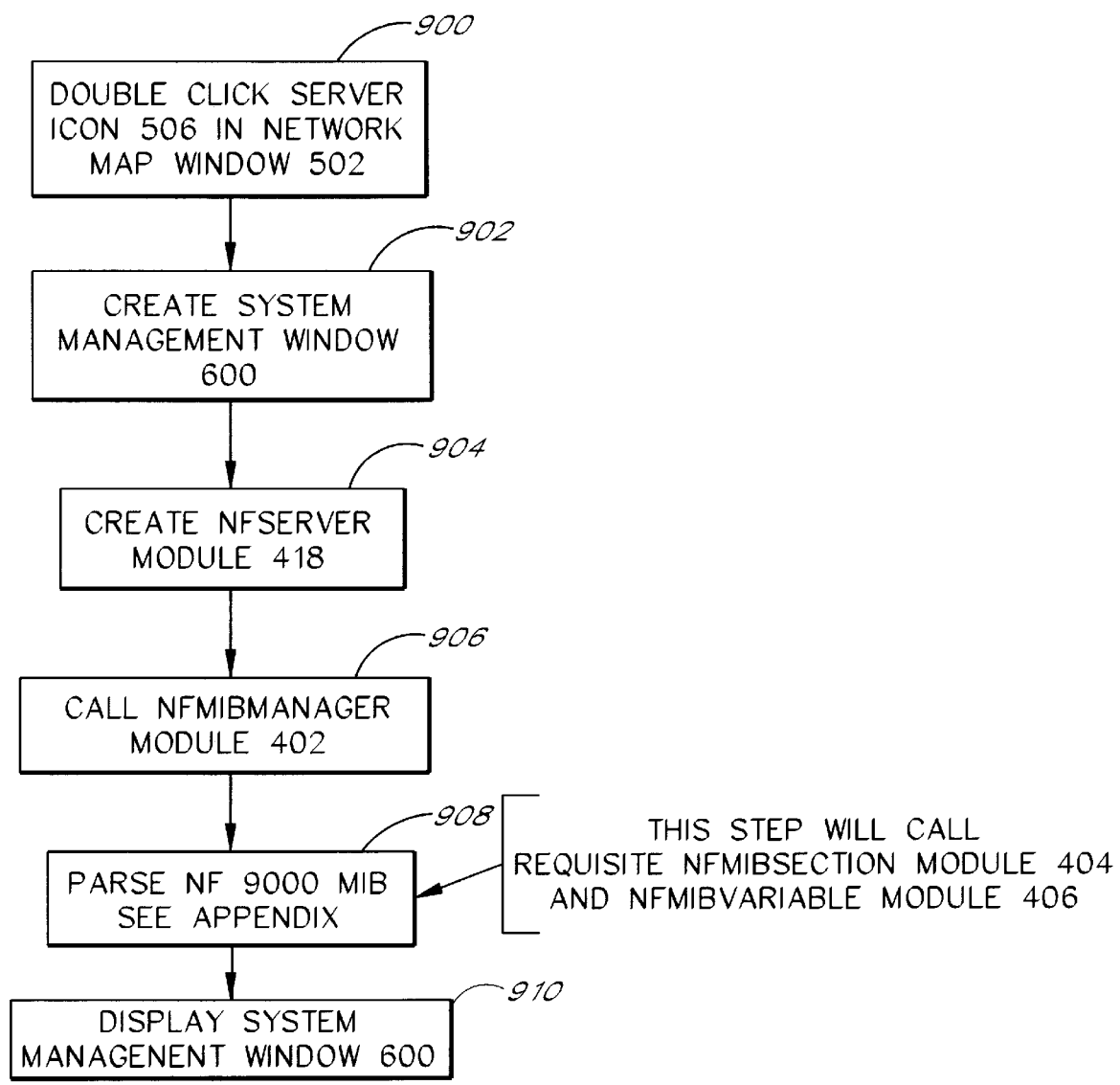
FIG. 9 illustrates the network data display process in one embodiment of the present invention.

In one embodiment of the present invention, the user may access the System Management Window 600 from the Network Map Window 502. FIG. 9 illustrates the module-level process of how the user starts the system management application in one embodiment of the present invention.

Specifically, when the user double-clicks on a server icon 506 or the server name 512 in the Network Map Window 502, Maestro 400 creates the System Management Window 600 and calls the Server Module 418, the MIB Manager Module 402, the MIB Section Module 404, and the MIB Variable Module 406, as shown in blocks 900 through 908. In block 910, Maestro 400 displays the System Management Window 600.

In one embodiment of the invention, the Server Module 428 may be used to store information about the server 136, such as the name and address of the server 136. The Server Module 428 may contain information on how to display the server 136 as an server icon 606 on the System Management Window 602 in one embodiment of the invention.

Figure 6:
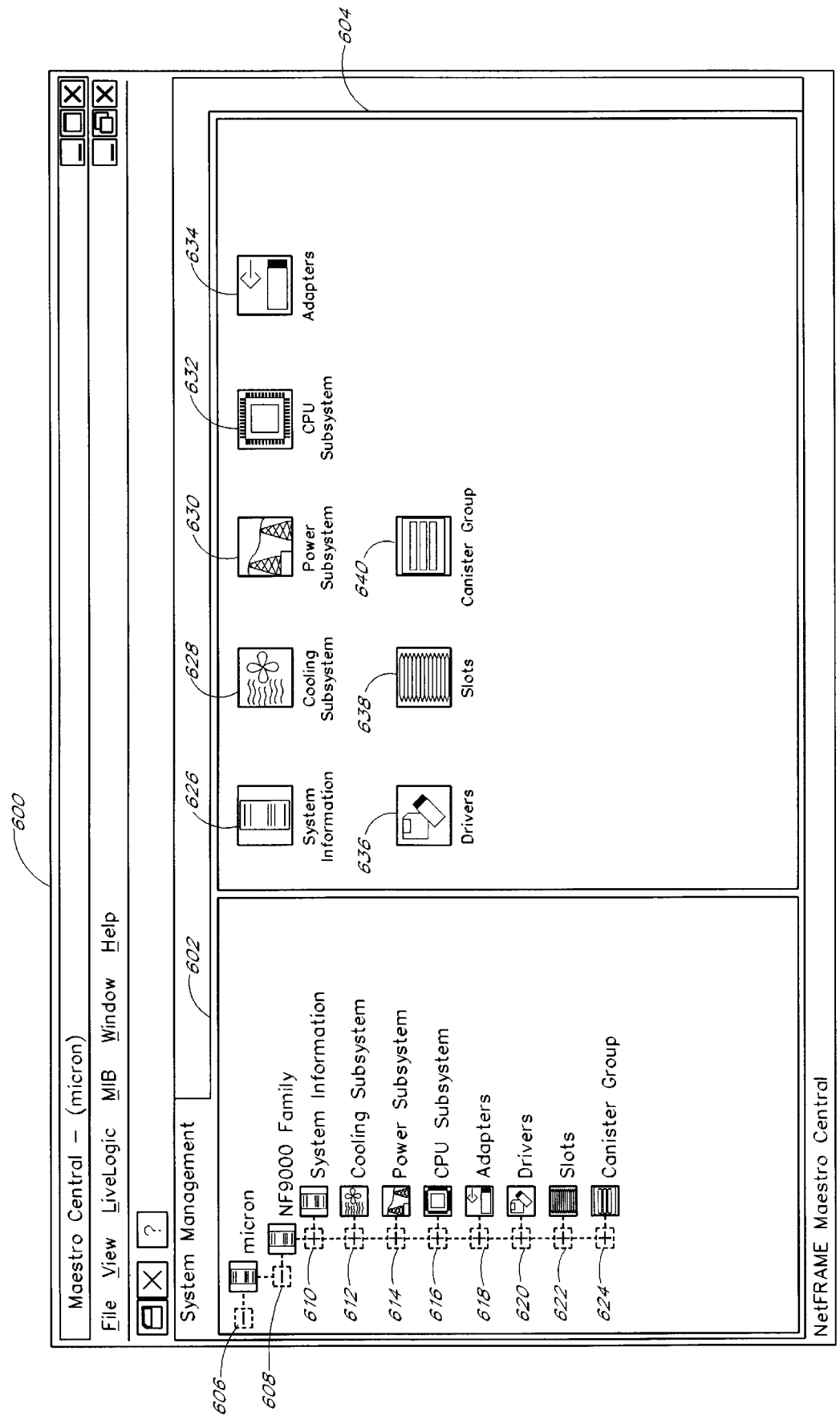
FIG. 6 illustrates a system management window in one embodiment of the present invention.

After the Server Module 420 and the MIB Manager Module 402 are created, Maestro 400 displays the System Management Window 600 as shown in FIG. 6 of one embodiment of the invention. All server management functions may be provided through this window. In one embodiment of the invention, the System Management Window 600 is divided into a left part 602 and a right part 604. In one embodiment of the invention, a 'MIB Tree' is displayed in the left part 602.

Figure 2B:
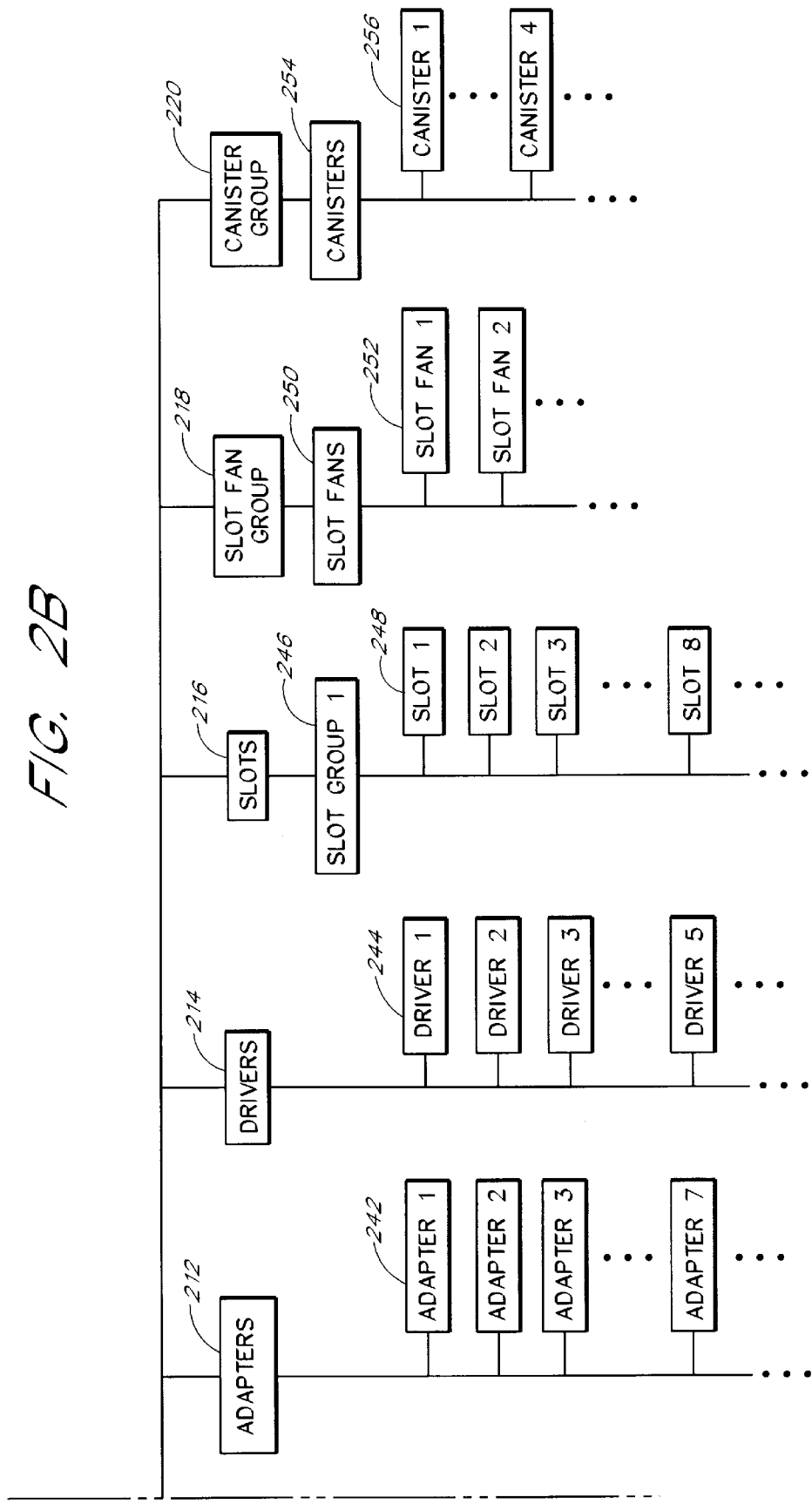

FIG. 2 illustrates the MIB Tree in one embodiment of the present invention. The MIB Tree is simply the name 200 of the server 136, the server type 202, and the major subsystems of the server 136. In one embodiment of the present invention, the type of server 136 is a NF9000 manufactured by NetFRAME of Milpitas, Calif. The subsystems may include the overall System Group 204 the Cooling Subsystem 206, the Power Subsystem 208, the CPU Subsystem 210, the Adapter Group 212, the Driver Group 212, the Slot Group 216, the Slot Fan Group 218, and the Canister Group 220.

The 'root' level of the tree is the name 200 of the server 136, and the different sections are the 'child' branches 204 through 220 of the root. If a group has subgroups or contains more than one device, then it will contain "child" branches for those subgroups or devices. For example, the Cooling Subsystem 206 has two subgroups: the Fans 226 and the Temperature Sensors 230. The Fans subgroup 226 then has child branches for individual fans 228.

Creating and Displaying Forms for Subsystems in the MIB Tree

Figure 10:
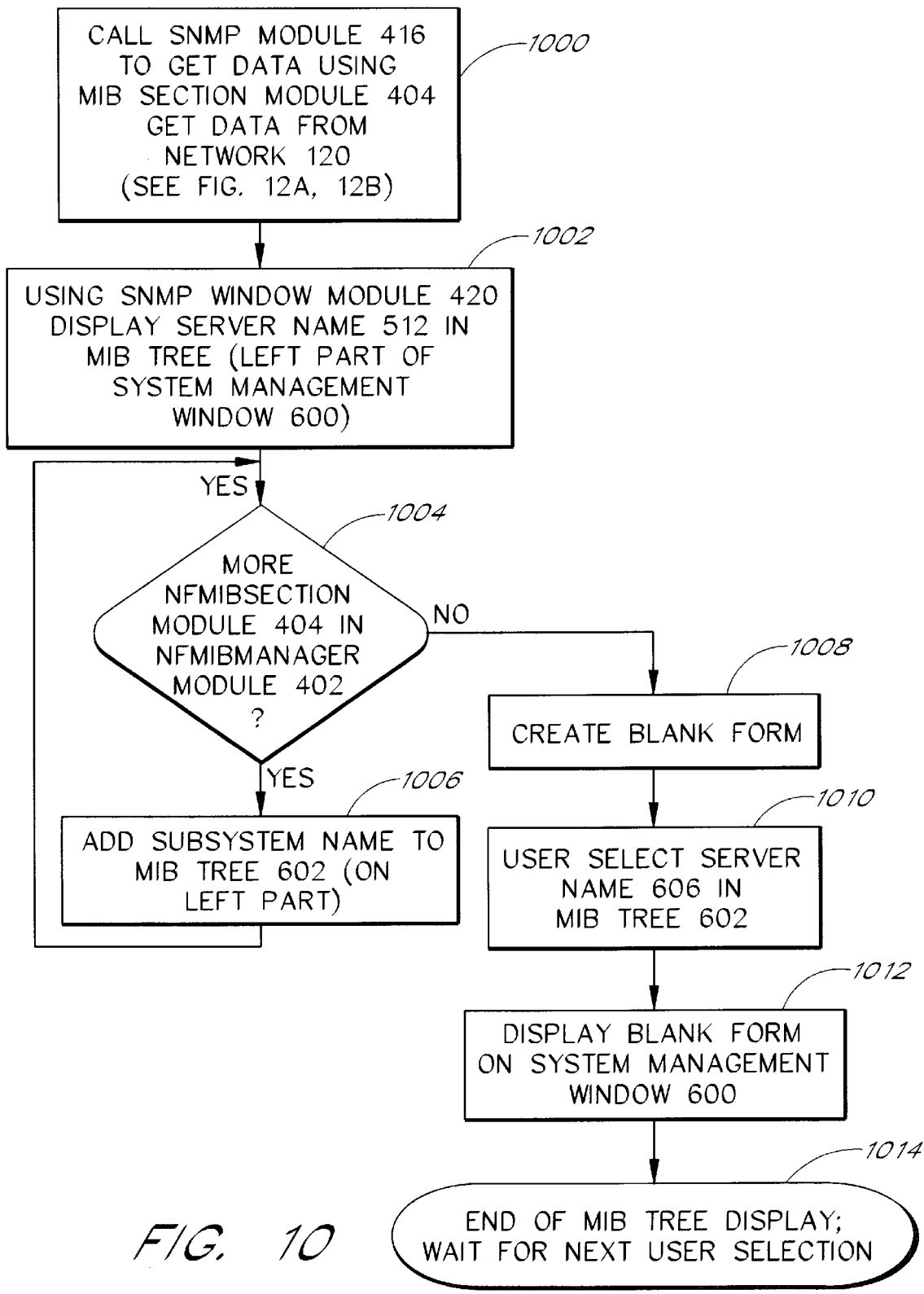
FIG. 10 illustrates the process of retrieving network data and displaying a hierarchal tree in one embodiment of the present invention.

FIG. 10 illustrates the module-level process of retrieving and displaying the MIB Tree and its associated forms in the System Management Window 600 in one embodiment of the present invention. In block 1000, the MIB Manager Module 402 calls the SNMP Module 416 to get MIB data from the network 120 using the MIB Section Module 404. In block 1002, the SNMP Window Module 416 then displays the server name 200 in the left part 602 of the System Management Window 600. In blocks 1004 and 1006, the MIB Manager Module 402 looks for the server's major subsystems using the MIB Section Module 404. These subsystems are displayed under the server name 606 and the type of server 608. The System Management Window 600 also displays icons of the eight major subsystems on the right part 604 of the window.

Figure 11:
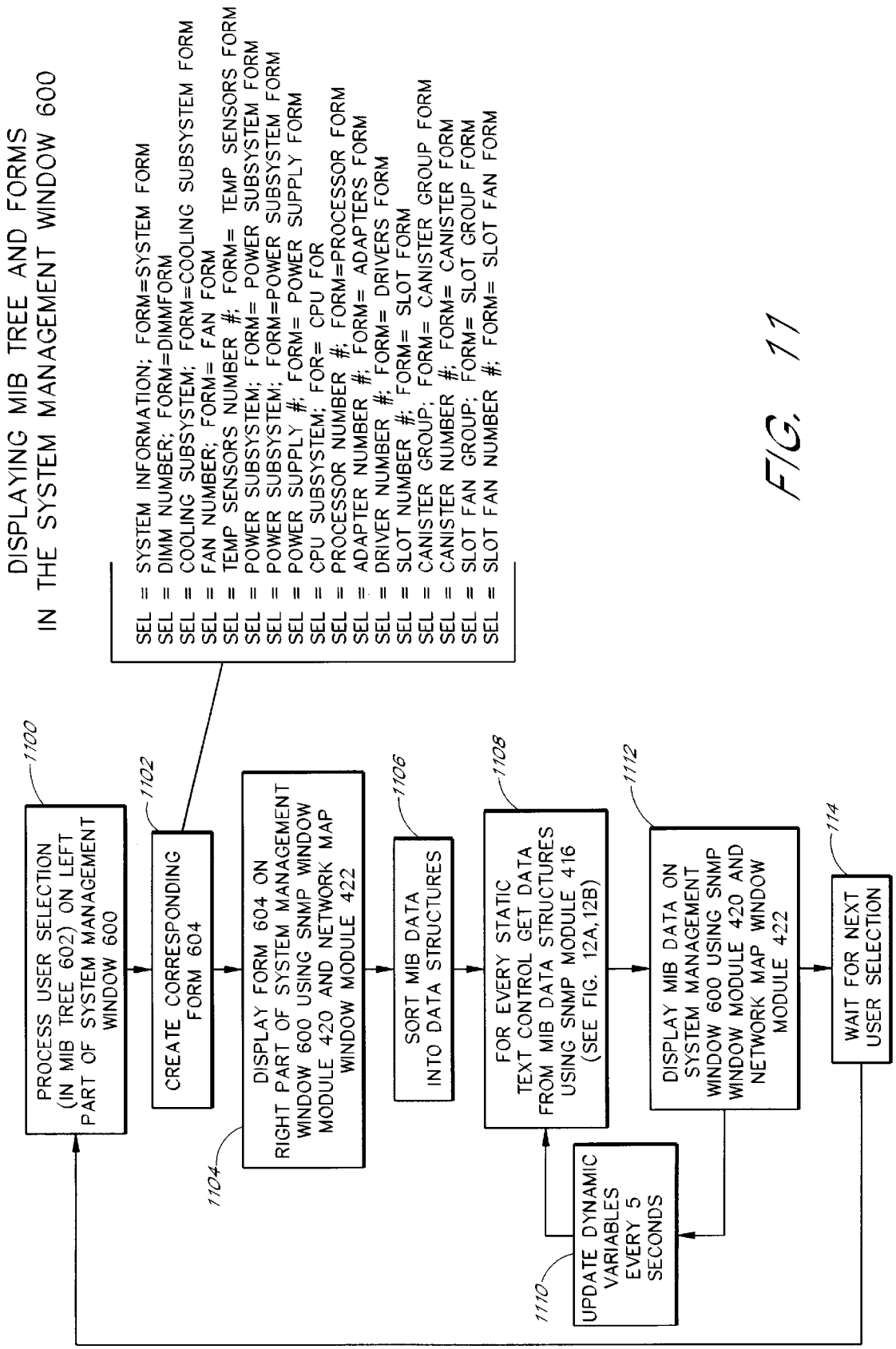
FIG. 11 illustrates the series of commands executed in the process of Iretrieving and displaying network data in one embodiment of the present invention.

The user may double-click on the icons on either the left part 602 or the right part 604 of the System Management Window 600 to access the subgroups and individual devices. FIG. 11 illustrates the series of commands executed in the process of retrieving and displaying MIB data in forms in the system management window in one embodiment of the present invention. In block 1102, the MIB Manager Module 402 creates the form corresponding to the user's selection. After the appropriate form is created, the MIB Manager Module 402 calls the SNMP Window Module 420 and the Network Map Window Module 422 to display the form in the right part 604 of the System Management Window 600.

Figure 17:
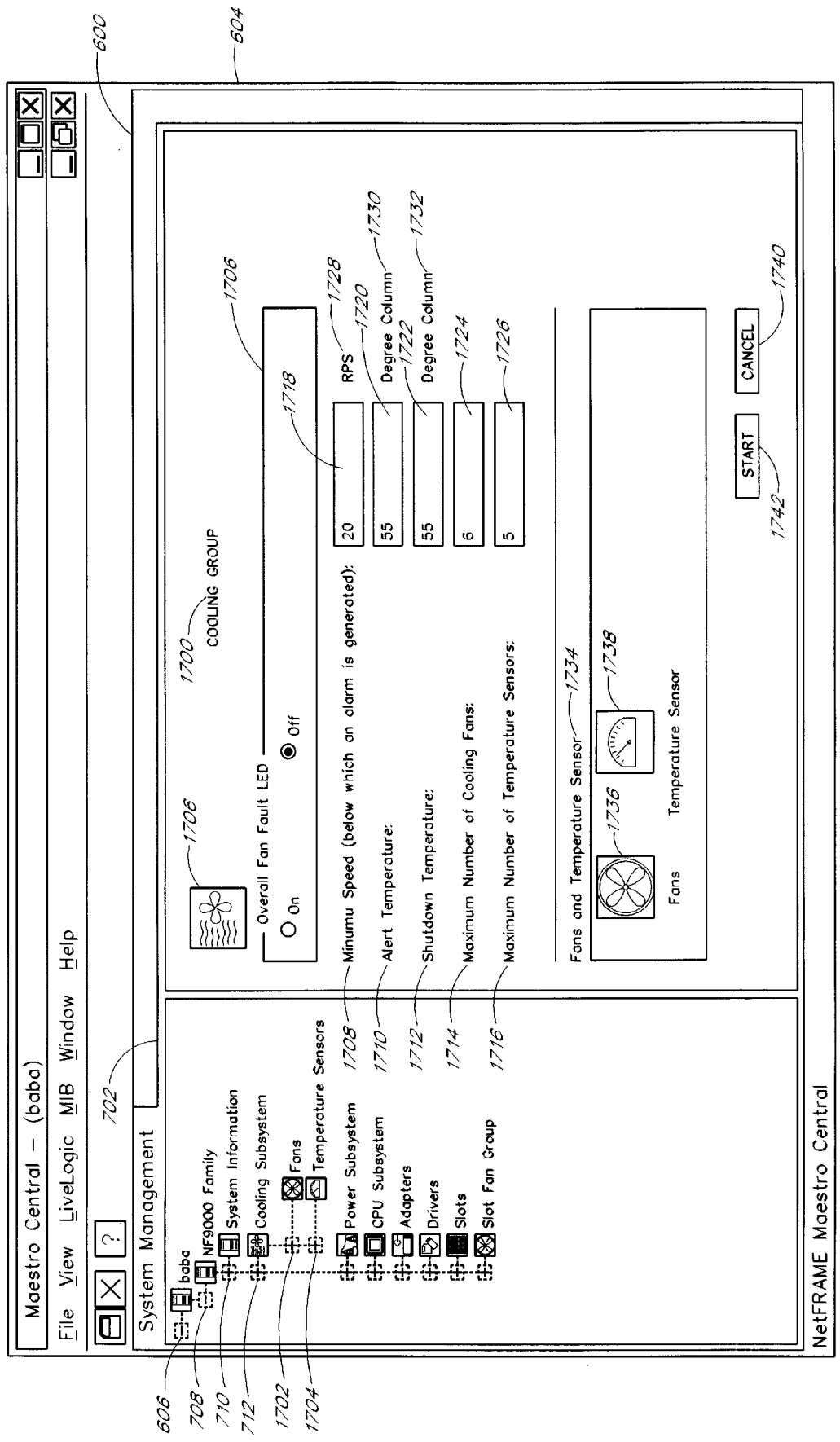
FIG. 17 illustrates one embodiment of a cooling subsystem window.
Figure 18:
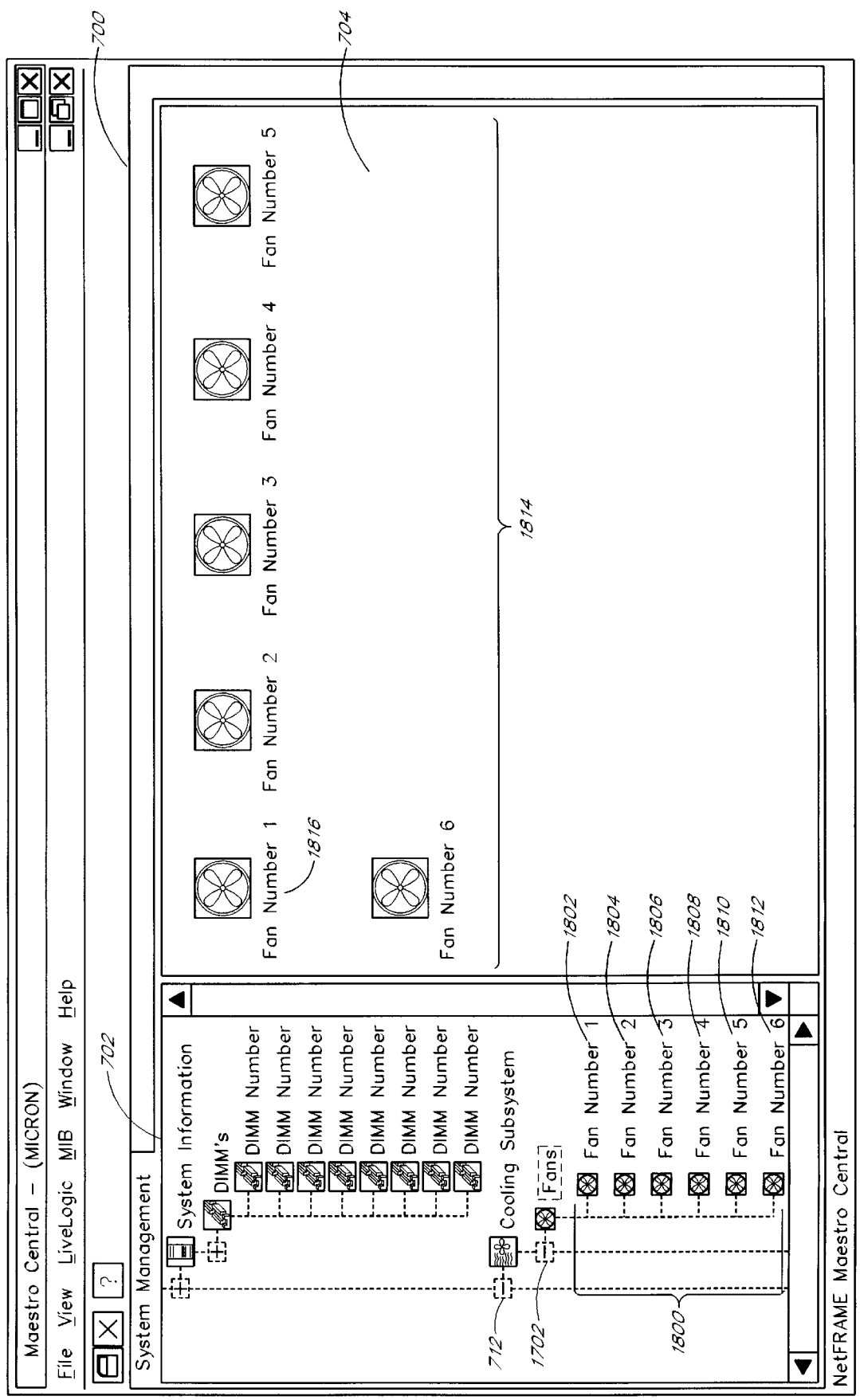
FIG. 18 illustrates one embodiment of a general system board fans window.

For example, if the user clicks on the Cooling Subsystem icon 612 or 618, the corresponding form created by the MIB Manager Module 402 is the Cooling Subsystem Form in block 1102. FIG. 17 shows one embodiment of the Cooling Subsystem Form in the right part 604 of the System Management Window 600. In block 1106, the MIB data is sorted into data structures. In block 1108, the SNMP Module 416 gets data from these data structures to form the static text in the right part 604 of the System Management Window 600. For example, the title "COOLING GROUP" 1600 is static text that will not change with time. This text is displayed by the SNMP Window Module 416 and the Network Map Window Module 422 as shown in block 1102.

Retrieving and Displaying Values for Dynamic MIB Variables

Figure 12B:
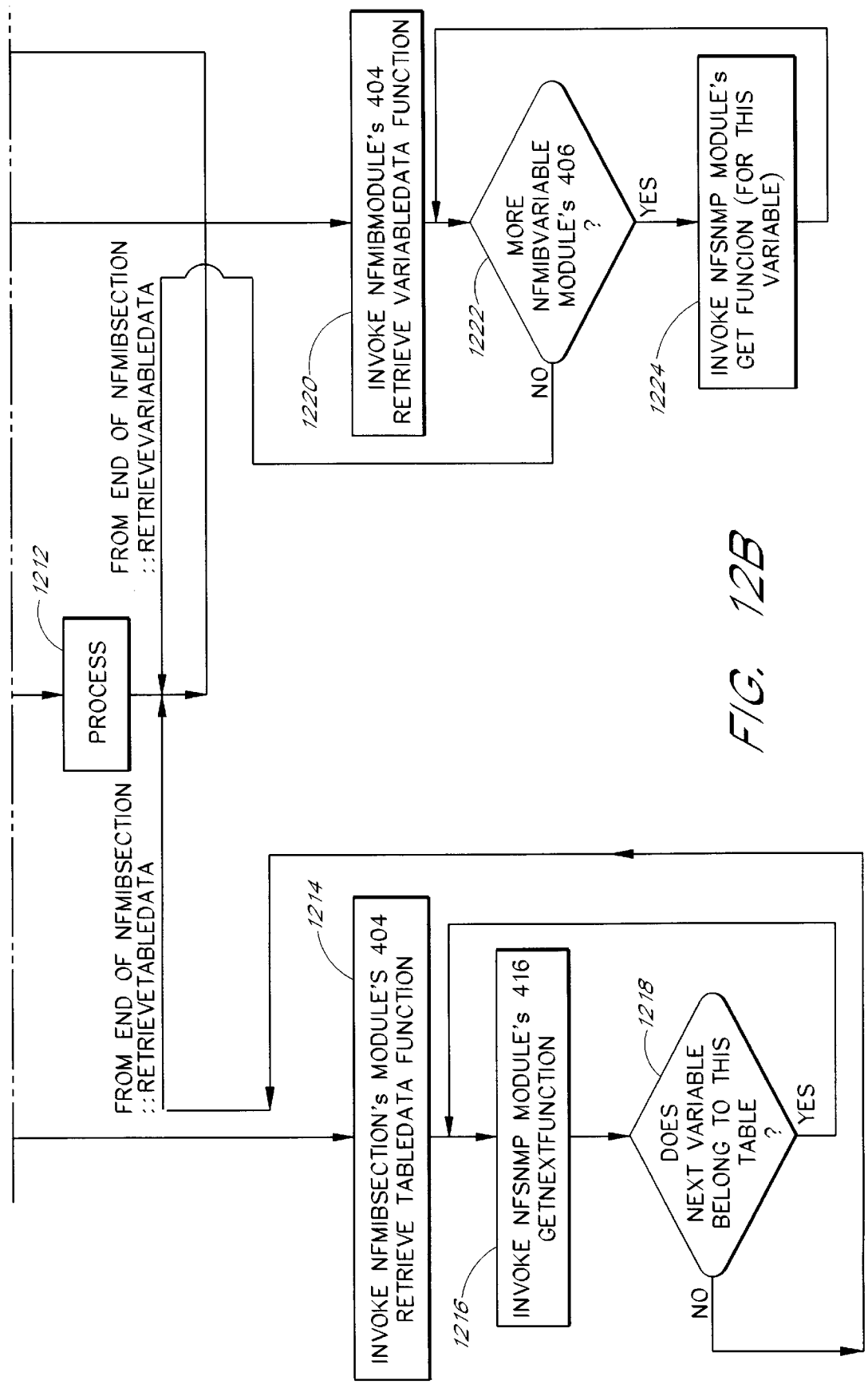

FIGS. 12A and 12B illustrate the module-level process of retrieving data from a server 136 in one embodiment of the present invention. The MIB Manager Module 402 may contain one or more "retrieve data" functions. This is shown in block 1204. The MIB Manager Module 402 may, in addition or instead, direct other modules to retrieve and display the MIB data. In one embodiment of the invention, the MIB Manager Module 402 calls the MIB Section Module 404 and the MIB Variable Module 406 to retrieve and temporarily store MIB data retrieved from the server 136. This is shown in blocks 1204 through 1224.

In block 1208 of one embodiment of the invention, the MIB Manager Module 402 invokes the MIB Section Module's "retrieve data" function. The MIB Section Module 404 may be used to retrieve MIB data contained in a table or organized in a group of variables in one embodiment of the invention. The MIB Section Module 404 then queries whether the requested data is a single variable or a table of variables. If the requested data is a table, the MIB Section Module's "retrieve table data" function is invoked in block 1214. As shown in block 1216 and 1218, the MIB Section Module 404 invokes the SNMP Module's GET NEXT function, which continues to retrieve data until there are no more variables in the MIB table. The MIB Section Module 404 may also be used to store retrieved MIB data and/or MIB table data.

If the requested information is not a table, the MIB Variable Module 406 may be used to retrieve MIB data in one embodiment of the invention. As shown in blocks 1222 and 1224, the MIB Variable Module invokes the SNMP Module's GET function, which continues to retrieve data until there are no more MIB variables requested. The MIB Variable Module 406 may be used to store retrieved MIB data.

In the cooling subsystem 206 example used above, one embodiment of present invention uses variable identifiers within the MIB to retrieve data. When the user clicks on the Cooling Subsystem icon in one embodiment of the invention, the MIB Section Module 404 and the MIB Variable Module 406 retrieve values for the following MIB variables:

"coolingFanGeneralLED"
"coolingFanMinSpeed"
"coolingFanSpeedSetting"
"coolingMaximumNumberOfSystemFans"
"coolingFanNumber"

"coolingFanSpeed"
"coolingFanFault"
"coolingFanLocation"
"coolingAlertTemperature"
"coolingShutdownTemperature"
"coolingMaximumNumberOfTemperatureSensors"
"coolingSensorNumber"
"coolingSensorTemperature"
"coolingSensorLocation"

Although only the variables for the cooling subsystem 206 are shown here, the process is the same when the user clicks on any one of the other subsystems or device groups. The MIB Section Module 402 and the MIB Variable Module 406 will retrieve the values of the MIB variables associated with those other device groups or subsystems.

After the MIB Manager Module 402 retrieves the values of the requested MIB variables, the SNMP Window Module 420 may sort the data into data structures and display the data in dialog boxes in the right part 604 of the System Management Window 600. This is shown in block 1226 in one embodiment of the invention. One embodiment of the invention also updates the values of dynamic variables every five seconds, as shown in block 1228.

For example, the variable "coolingFanMinSpeed" represents the minimum speed below which a system board fan is considered malfunctioning in one embodiment of the invention. This variable is defined in the MIB itself as shown in FIG. 4. CoolingFanMinSpeed is identified in the MIB as "1.3.6.1.4.1.837.2.3.2.0." The MIB Manager Module 402 uses this numeric MIB identifier to invoke the MIB Variable Module 406 which sends a request to the SNMP agent 128. The SNMP agent 128 retrieves this value and sends it to the SNMP Module 416. The SNMP Module 416 calls the SNMP Window Module 420 to display it in a dialog box 1718. The dialog box is labelled "Minimum Speed (below which an alert is generated)" 1608. The value is further labelled "RPS" 1728 (revolutions per second).

In one embodiment of the present invention, the MIB Manager Module 402 does not display all of the cooling subsystem MIB variables at once on the right part 604 of the System Management Window 600. Instead, one embodiment of the claimed invention only displays the values for the following cooling subsystem variables on the right part 602 of the System Management Window 600:
"coolingFanGeneralLED"
"coolingFanMinSpeed"
"coolingMaximumNumberOfSystemFans"
"coolingAlertTemperature"
"coolingShutdownTemperature"
"coolingMaximumNumberOfTemperatureSensors"

These particular MIB variables are displayed together because they relate generally to all the components of a particular subsystem or subgroup instead of a particular device. This is illustrated in FIGS. 14, 17, 22, 25, 35, and 37. In FIG. 17, the MIB variables relate generally to the cooling subsystem. If the user wants to see MIB data for a particular device, the user may click on either the Fans icon 1702 or 1736 or the Temperature Sensors icon 1704 or 1738 on either the left 702 or right part 704 of the System Management Window 600.

In one embodiment of the present invention, the values of the MIB variables are displayed in descriptive dialog boxes with labels such as "RPS" (revolutions per second) 1728 and "Degrees Celsius" 1730 and 1732.

Once MIB data is retrieved from the server 136, the MIB Manager Module 402 may update dynamic variables, such as fan speed, which are currently being viewed by the user every five seconds in one embodiment of the invention. This is shown in block 1228. For dynamic variables that are not currently being displayed, the user may separately configure the interval between data retrievals to be any time duration, including durations such as a half hour or an hour.

Displaying Child Branches of the MIB Tree

When the user clicks on one of the major subsystem icons 610 through 740 in either the left part 602 or the right part 604 of the System Management Window 600 shown in FIG. 7, the SNMP Window Module 420 displays the child branches of that subsystem.

In one embodiment of the present invention, the icons labelled "Fans" 1702 and "Temperature Sensors" 1704 are displayed as child branches under the icon labelled "Cooling Subsystem" 612 on the left part 602 of the System Management Window 600. These are two subgroups of MIB variables in the cooling subsystem 206.

If the user clicks on the child branch labelled "Fans" 1702 under the "Cooling Subsystem" icon 612 on the left part 602 of the System Management Window 600, the SNMP Window Module 420 displays all the system board fan icons 1800 as child branches numbered one through n, n being the total number of fans, under the icon labelled "Fans" 1702. For example, if there are six system board fans in an embodiment of the invention, then the left part 602 of the System Management Window 600 will show "Fan Number 1" 1802, "Fan Number 2" 1804, "Fan Number 3" 1806, "Fan Number 4" 1808, "Fan Number 5" 1810, and "Fan Number 6" 1812.

If the user clicks on child icon labelled "Fan Number 1" 1802 or 1816, in either the left part 602 or right part 604 of the System Management Window 600, the SNMP Window Module 420 displays the form for Fan Number 1 as shown in FIG. 19.

Although only the subgroups and individual devices for the cooling subsystem 206 are discussed here, the process is the same when the user clicks on any one of the other subsystems or device groups. The SNMP Window Module 420 will display the subgroups and/or individual devices under those subsystems or device groups.

Changing the Values for Read-Write MIB Variables

Some MIB variables are read-write in one embodiment of the invention. These variables can be modified by the user and are displayed in white dialog boxes in the right part 604 of the System Management Window 600. For example, the MIB variable "coolingFanMinSpeed" is modifiable from the right part 604 of the System Management Window 600. This is shown in FIG. 17.

Figure 13:
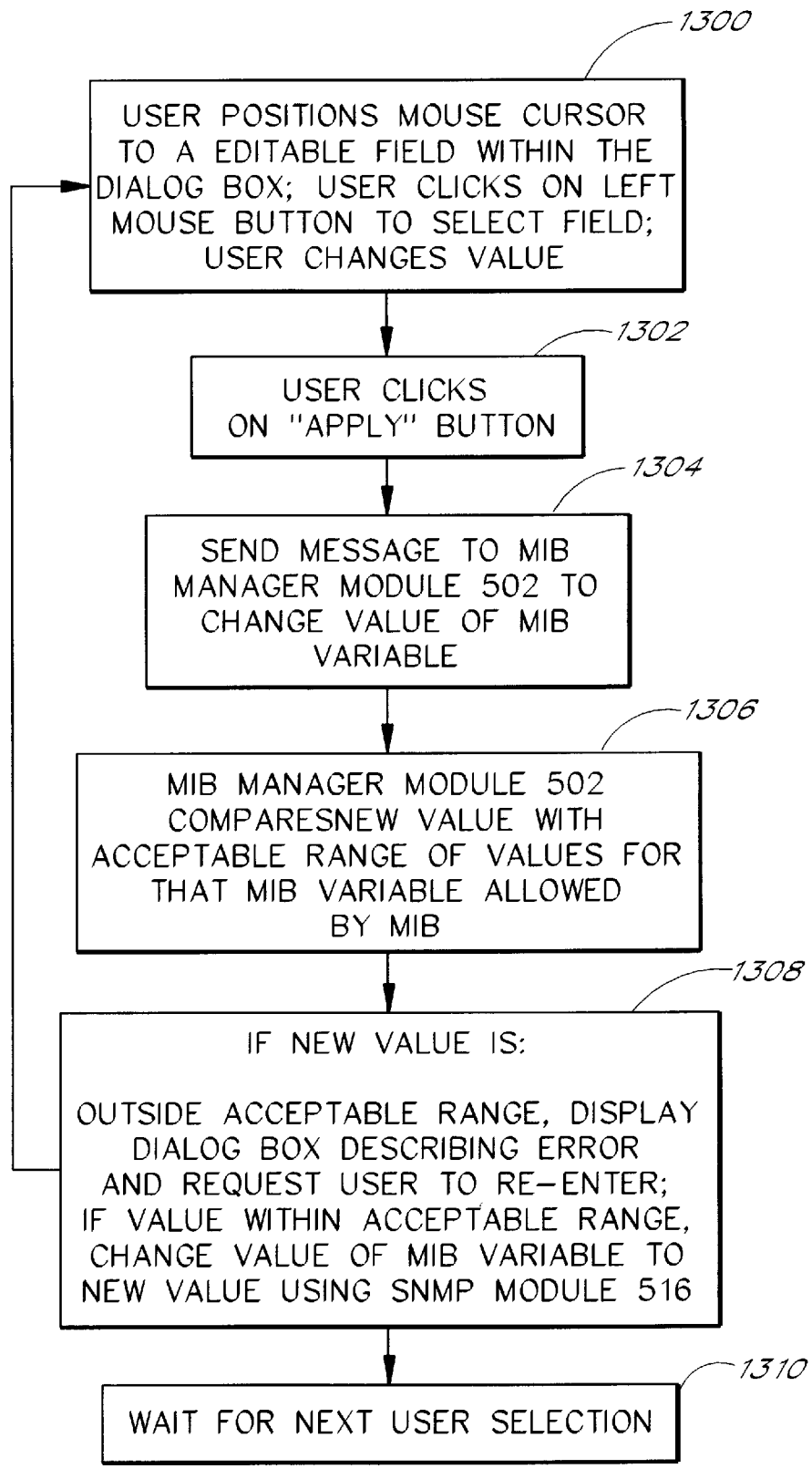
FIG. 13 illustrates the process of modifying network data values in one embodiment of the invention.
Figure 14:
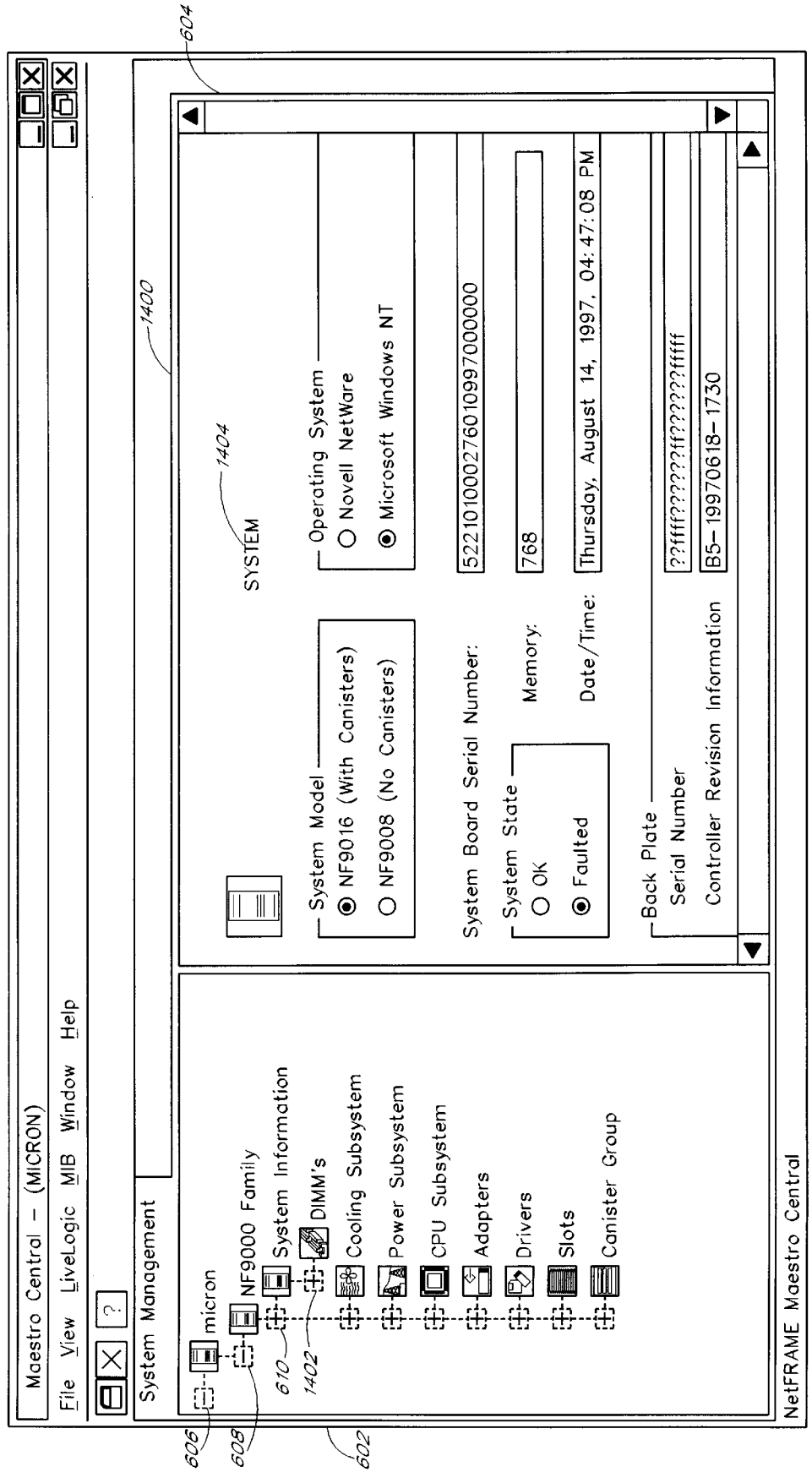
FIG. 14 illustrates one embodiment of a system information window.
Figure 15:
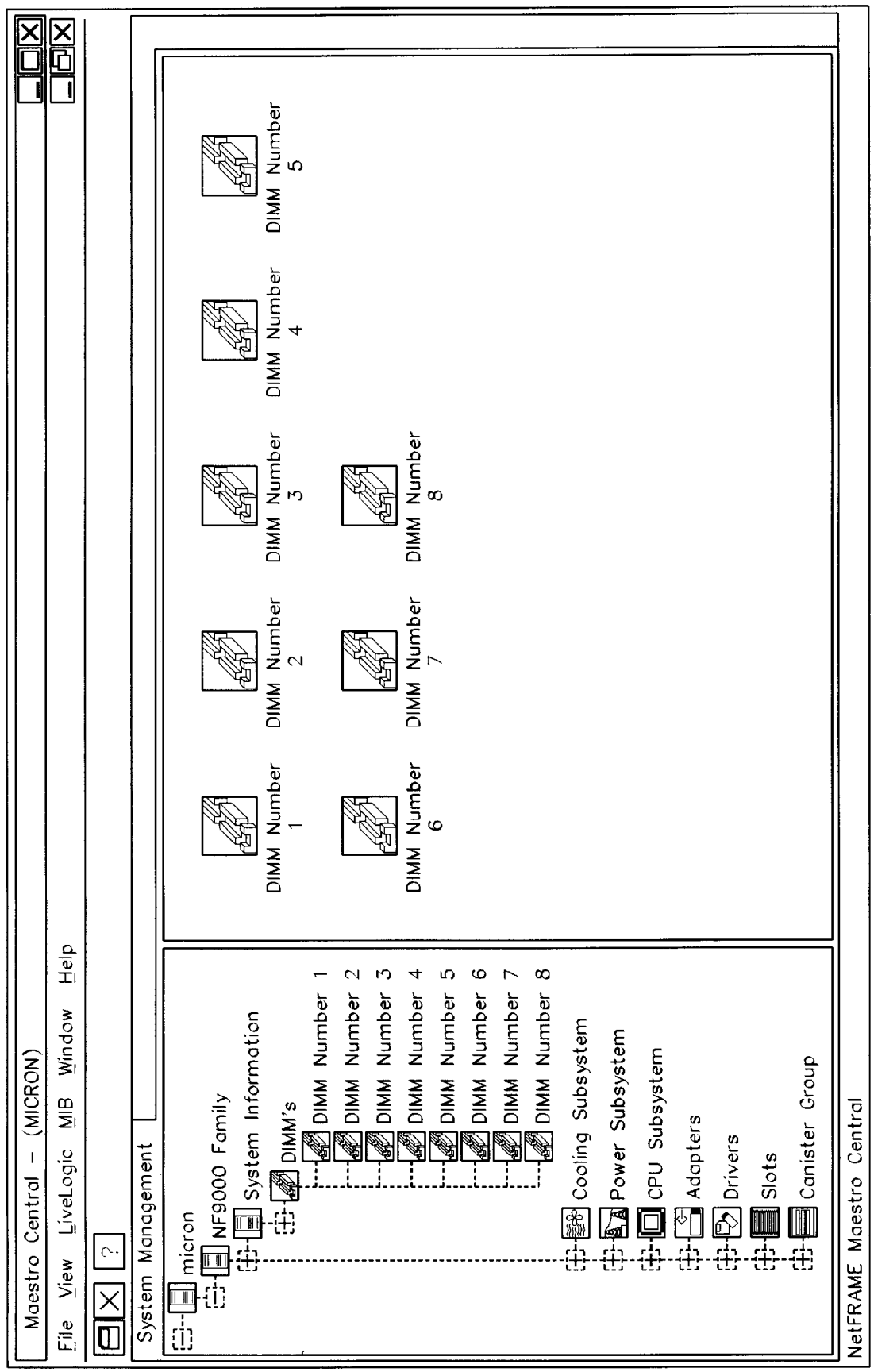
FIG. 15 illustrates one embodiment of a dual-pane window which displays data about dual interface memory modules.
Figure 16:
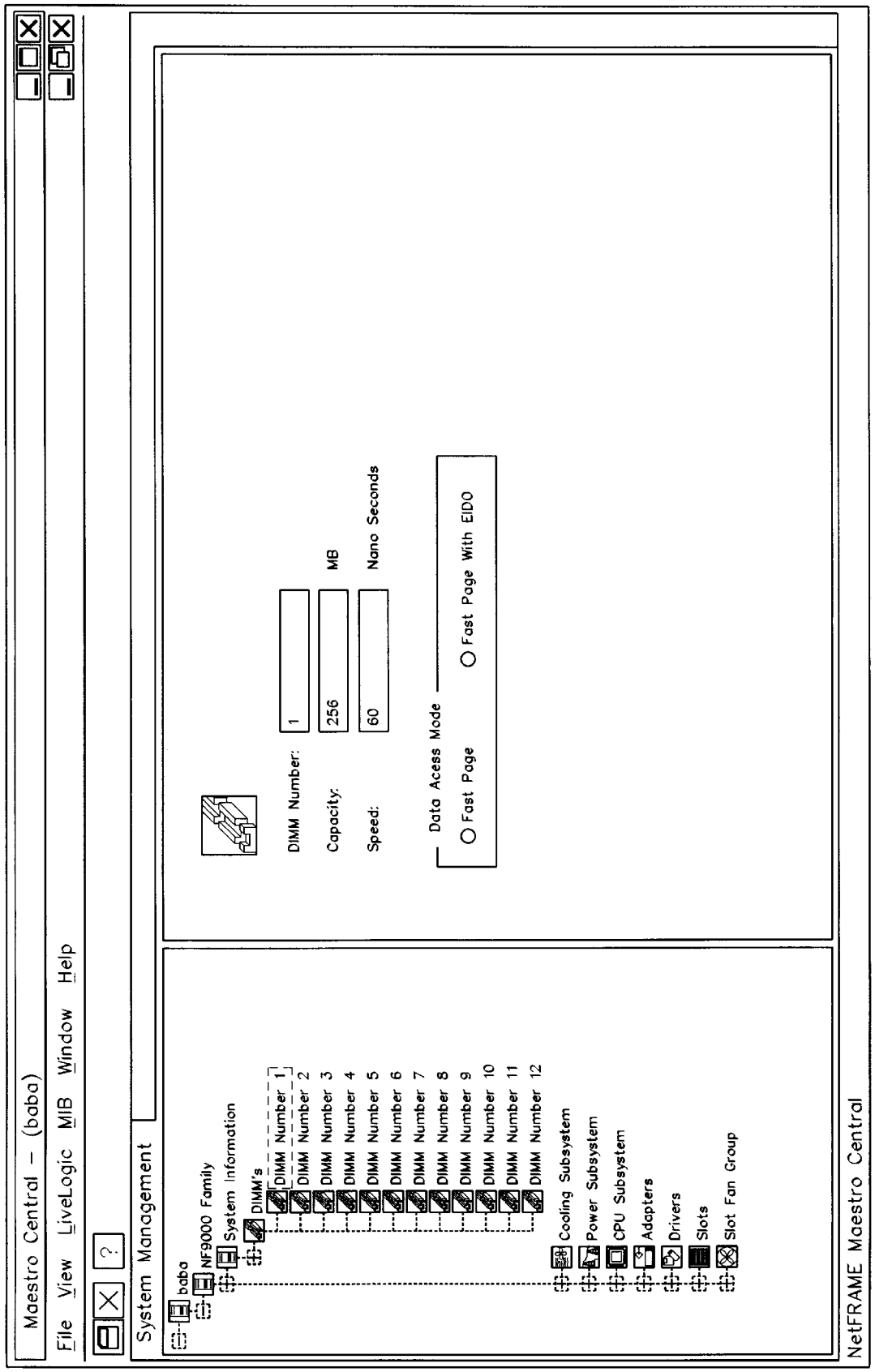
FIG. 16 illustrates one embodiment of a window for a single dual interface module device.

FIG. 13 illustrates the module-level process of changing values of MIB variables in one embodiment of the invention. In block 1300, the user can change the value of this variable by (1) moving the mouse cursor to the white area of the dialog box related to Minimum Speed 1718, (2) backspacing or highlighting the current value using the left mouse button, and (3) typing in the number of a new minimum fan speed. This value can be anywhere from 0 to 255 as defined by the MIB. A change to this variable affects all system board fans. After the user enters a new value, the user clicks on the "apply" button 1740 in block 1302. As shown in blocks 1306 and 1308, the MIB Manager Module 402 and the SNMP Window Module 420 displays an error dialog box if the user enters a number outside the defined range for the MIB variable in one embodiment of the invention.

In one embodiment of the invention, the MIB Manager Module 402 may modify the MIB variable itself or it may call other modules to implement the user's changes. In one embodiment of the present invention, the MIB Manager Module 402 may call the SNMP Module 416 to use its "set" function to change a read-write variable. The MIB Manager Module 402 may also call the MIB Section Module 404 and/or the MIB Variable Module 406 to implement the change.

Advantages of the Present Invention

First, one advantage of the present invention is that the subsystems of the server 136 are organized in an easy-to-access and efficient manner. There are only eight subgroups in one embodiment. Unlike prior inventions, one embodiment of the present invention keeps the left part 602 of the System Management Window 600 unfettered with unduly confusing subheadings and variables. At a glance, the user can quickly see the major components of the server in one embodiment of the invention and select a subsystem in which to probe further. This saves the network administrator time and improves the overall network productivity.

Furthermore, each MIB subsystem, subgroup, and device are clearly identified in the present invention. There are no ambiguous variables such as "Rmtntrfce Controller Revision I." The network administrator does not need to learn new variables or refer to software manuals. The present invention removes the focus of the user from the interface format and allows the user to concentrate on the information itself. This further saves time and improves productivity.

Another advantage of one embodiment of the invention is that the MIB Manager Module 402 does not display the entire MIB, unlike prior inventions. In other words, one embodiment of the invention does not display the variables in the MIB that are not accessible to the user. Instead of generating a "???" entry or a "Not Available," the present invention reduces user confusion and saves window space by not displaying these MIB variables at all. For example, in one embodiment, the MIB variable "coolingFanTableEntry" is not accessible to the user so the embodiment does not display this variable.

Second, the present invention displays all data related to a subsystem or all data related to an individual device in a single window on the right part 604 of the System Management Window 600. For example, one embodiment of the present invention displays "Minimum Speed (below which an alert is generated)," "Alert Temperature" and "Shutdown Temperature" in the same window. The user does not have to use scroll bars to move up and down or left and right to find and compare related variables as in prior inventions. This allows the network administrator to compare values quickly and make a decision. This becomes particularly important in time-critical applications, where network administrators need to make quick assessments about the network server and act accordingly.

Third, the MIB variables in one embodiment of the present invention are clearly described on the right part 604 of the System Management Window 600. For example, "Minimum Speed" is accompanied by the description "(below which an alert is generated)." The user does not need to look up the variable in a software manual. This saves time for the network administrator, particularly in time-critical situations.

Fourth, the values for each MIB variable is labelled in one embodiment of the invention. For example, fan speed is labelled "RPS" 1728 (revolutions per second) and temperature is labelled "Degrees Celsius." The user does not need to make guesses or look the variables up in a support manual.

Fifth, the user can navigate and change MIB data in the System Management Window 600 itself by pointing and clicking at the value itself, such as "Alert Temperature" 1720. The user does not need to open and close any other dialog box or menus. This saves the user valuable administration time, especially if the user needs to modify a list of variables.

Furthermore, the variables that can be changed by the user are clearly shown in white boxes in one embodiment of the present invention. This saves the user time from guessing which variables can be modified.

While the above detailed description has shown, described and pointed out the fundamental novel features of the invention as applied to a preferred embodiment, it will be understood that various omissions, substitutions and changes in the form, and details of the illustrated device may be made by those skilled in the art without departing from the spirit of the invention. Consequently, the scope of the invention should not be limited to the foregoing discussion but should be defined by the appended claims.

| Title | Application No. | Attorney Docket |
|---|---|---|
| "System Architecture for Remote Access and Control of Environmental Management" | 08/942,160 | MNFRAME.002A1 |
| "Method of Remote Acess and Control of Environmental Management" | 08/942,215 | MNFRAME.002A2 |
| "System for Independent Powering of Diagnostic Processes on a Computer System" | 08/942,410 | MNFRAME.002A3 |
| "Method of Independent Powering of Diagnostic Processes on a Computer System" | 08/942,320 | MNFRAME.002A4 |
| "Diagnostic and Managing Distributed Processor System" | 08/942,402 | MNFRAME.005A1 |
| "Method for Managing a Distributed Processor System" | 08/942,448 | MNFRAME.005A2 |
| "System for Mapping Environmental Resources to Memory for Program Access" | 08/942,222 | MNFRAME.005A3 |
| "Method for Mapping Environmental Resources to Memory for Program Access" | 08/942,214 | MNFRAME.005A4 |
| "Hot Add of Devices Software | 08/942,309 | MNFRAME.006A1 |

-continued

| Title | Application No. | Attorney Docket |
|---|---|---|
| Architecture" | | |
| "Method for The Hot Add of Devices" | 08/942,306 | MNFRAME.006A2 |
| "Hot Swap of Devices Software Architecture" | 08/942,311 | MNFRAME.006A3 |
| "Method for The Hot Swap of Devices" | 08/942,457 | MNFRAME.006A4 |
| "Method for the Hot Add of a Network Adapter on a System Including a Dynamically Loaded Adapter Driver" | 08/943,072 | MNFRAME.006A5 |
| "Method for the Hot Add of a Mass Storage Adapter on a System Including a Statically Loaded Adapter Driver" | 08/942,069 | MNFRAME.006A6 |
| "Method for the Hot Add of a Network Adapter on a System Including a Statically Loaded Adapter Driver" | 08/942,465 | MNFRAME.006A7 |
| "Method for the HotAdd of a mass Storage Adapter on a System Including a Dynamically Loaded Adapter Driver" | 08/962,963 | MNFRAME.006A8 |
| "Method for the Hot Swap of a Network Adapter on a System Including a Dynamically Loaded Adapter Driver" | 08/943,078 | MNFRAME.006A9 |
| "Method for the Hot Swap of a Mass Storage Adapter on a System Including a Statically Loaded Adapter Driver" | 08/942,336 | MNFRAME.006A10 |
| "Method for the Hot Swap of a Network Adapter on a System Including a Statically Loaded Adapter Driver" | 08/942,459 | MNFRAME.006A11 |
| "Method for the Hot Swap of a Mass Storage Adapter on a Syetm Including a Dynamically Loaded Adapter Driver" | 08/942,458 | MNFRAME.006A12 |
| "Method of Performing an Extensive Diagnostic Test in Conjunction with a BIOS Test Routine" | 08/942,463 | MNFRAME.008A |
| "Apparatus for Performing an Extensive Diagnostic Test in Conjunction with a BIOS Test Routine" | 08/942,163 | MNFRAME.009A |
| "Configuration Manangement Method for Hot Adding and Hot Replacing Devices" | 08/941,268 | MNFRAME.010A |
| "Configuration Management System for Hot Adding and Hot Replacing Devices" | 08/942,408 | MNFRAME.011A |
| "Apparatus for Interfacing Buses" | 08/942,382 | MNFRAME.012A |
| "Method for Interfacing Buses" | 08/942,413 | MNFRAME.013A |
| "Computer Fan Speed Control Device" | 08/942,447 | MNFRAME.016A |
| "Computer Fan Speed Control Method" | 08/942,216 | MNFRAME.017A |
| "System for Powering Up and Powering Down a Server" | 08/943,076 | MNFRAME.018A |
| "Method of Powering Up and Powering Down a Server" | 08/943,077 | MNFRAME.019A |
| "System for Resetting a Server" | 08/942,333 | MNFRAME.020A |
| "Method of Resetting a Server" | 08/942,405 | MNFRAME.021A |
| "System for Displaying Flight Recorder" | 08/942,070 | MNFRAME.022A |
| "Method of Displaying Flight Recorder" | 08/942,068 | MNFRAME.023A |
| "Synchronous Communication Interface" | 08/943,355 | MNFRAME.024A |
| "Synchronous Communication Emulation" | 08/942,004 | MNFRAME.025A |
| "Software System Facilitating the Replacement or Insertion of Devices in a Computer System" | 08/942,317 | MNFRAME.026A |
| "Method for Facilitating the Replacement or Insertion of Devices in a Computer System" | 08/942,316 | MNFRAME.027A |
| "System Management Graphical User Interface" | 08/943,357 | MNFRAME.028A |
| "Data Management System Supporting Hot Plug Operations on a Computer" | 08/942,129 | MNFRAME.030A |
| "Data Management Method Supporting Hot Plug Operations on a Computer" | 08/942,124 | MNFRAME.031A |
| "Alert Configurator and Manager" | 08/942,005 | MNFRAME.032A |
| "Managing Computer System Alerts" | 08/943,356 | MNFRAME.033A |

-continued

| Title | Application No. | Attorney Docket |
|---|---|---|
| "Computer Fan Speed Control System" | 08/940,301 | MNFRAME.034A |
| "Computer Fan Speed Control System Method" | 08/941,267 | MNFRAME.035A |
| "Black Box Recorder for Information System Events" | 08/942,381 | MNFRAME.036A |
| "Method of Recording Information System Events" | 08/942,164 | MNFRAME.037A |
| "Method for Automatically Reporting a System Failure in a Server" | 08/942,168 | MNFRAME.040A |
| "System for Automatically Reporting a | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automaticaaly Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |
| "System for Detecting Network Errors" | 08/942,407 | MNFRAME.060A |
| "Method of Detecting Network Errors" | 08/942,573 | MNFRAME.061A |

What is claimed is:

1. A method for displaying information regarding components in a computer network, comprising the acts of:
providing a plurality of operational parameters about different components in a computer network, said operational parameters further organized into a plurality of hierarchical levels;
providing a plurality of forms which enable the display and modification of one or more of said operational parameters, each of said forms corresponding to one of said hierarchical levels;
displaying said hierarchical levels, in a first display pane;
enabling the selection of one of said hierarchical levels via said first display pane;
displaying said form corresponding to said one of said hierarchical levels in a second display pane;
enabling the selection of another one of said hierarchical levels; and
replacing said form corresponding to said one of said hierarchical levels with said form corresponding to said another one of said hierarchical levels in said second display pane.

2. The method of claim 1 wherein said act of displaying said hierarchical levels displays a subset of said operational parameters associated with said selected hierarchical level.

3. The method of claim 1 wherein said hierarchical levels are defined in a management information base.

4. The method of claim 1 wherein said hierarchical levels are defined in a management information base compatible with a Simple Network Management Protocol.

5. The method of claim 1 further comprising the act of modifying one of said operational parameters.

6. The method of claim 5 further comprising the act of updating the status of said component corresponding to said modified operational parameter.

7. A method for displaying information regarding components in a computer network, comprising:
providing a plurality of operational parameters about different components in a computer network, said operational parameters further organized into a plurality of hierarchical levels;
providing a plurality of forms, each of said forms organized to correspond to one of said hierarchical levels, each of said forms further configured to provide descriptions of at least one of said operational parameters associated with said hierarchical levels and to permit modification of at least one of said operational parameters associated with said hierarchical levels;

displaying said hierarchical levels in a first display pane;

selecting one of said hierarchical levels;

displaying said form corresponding to said one of said hierarchical levels in a second display pane;

selecting of another one of said hierarchical levels; and replacing said form corresponding to said one of said hierarchical levels with said form corresponding to said another one of said hierarchical levels in said second display pane.

8. The method of claim 7 wherein said descriptions display the units of said operational parameters.

9. The method of claim 7 wherein said descriptions display the name of the component associated with said operational parameter.

10. The method of claim 7 wherein said descriptions display the name of a network server associated with said operational parameters.

11. The method of claim 7 further comprising the act of organizing said operational parameters into different groupings.

12. The method of claim 7 wherein said hierarchical levels include at least one of said operational parameters.

13. A method for displaying information regarding components in a computer network, comprising:

providing a plurality of operational parameters about different components in a computer network wherein some of said operational parameters are inaccessible and some of said operational parameters are accessible and wherein said operational parameters are further organized into a plurality of hierarchical levels;

providing a plurality of forms which are configured to exclude data about said inaccessible operational parameters, each of said forms corresponding to one of said hierarchical levels;

displaying said hierarchical levels in a first display pane;

selecting one of said hierarchical levels; and displaying said form corresponding to said one of said hierarchical levels in a second display pane and permitting modification of at least one of said accessible operational parameters.

14. The method of claim 13 wherein said first display pane displays a subset of said accessible operational parameters in said selected hierarchical level.

15. The method of claim 14 wherein subset of said accessible operational parameters are organized into a group of canisters.

16. The method of claim 14 further comprising the act of organizing said subset of said accessible operational parameters into a group of cooling system parameters.

17. The method of claim 14 further comprising the act of organizing subset of said accessible operational parameters into a group of temperature parameters.

18. The method of claim 14 further comprising the act of organizing said subset of said accessible operational parameters into a group of adapter parameters.

19. The method of claim 14 further comprising the act of organizing said subset of said accessible operational parameters into a group of driver parameters.

20. The method of claim 14 further comprising the act of organizing said subset of said accessible operational parameters into a group of processor parameters.

21. The method of claim 14 further comprising the act of organizing said subset of said accessible operational parameters into a group of slot parameters.

22. The method of claim 14 further comprising the act of organizing said subset of said accessible operational parameters into a group of slot fan parameters.

* * * * *

UNITED STATES PATENT AND TRADEMARK OFFICE
CERTIFICATE OF CORRECTION

PATENT NO. : 6,046,742
DATED : April 4, 2000
INVENTOR(S) : Srikumar N. Chari

It is certified that error appears in the above-identified patent and that said Letters Patent is hereby corrected as shown below:

Column 5,
Line 18, "Iretrieving" should be -- retrieving --

Column 16,
Line 47, "Remote Acess" should be -- Remote Access --

Column 17,
Line 33, "a Syetm" should be -- a System --

Signed and Sealed this

Thirteenth Day of November, 2001

Attest:

*NICHOLAS P. GODICI*
*Acting Director of the United States Patent and Trademark Office*

*Attesting Officer*